US005247864A

United States Patent [19]

Konishi

[11] Patent Number: 5,247,864

[45] Date of Patent: Sep. 28, 1993

[54] DISPLAY APPARATUS FOR ELECTRONIC MUSICAL INSTRUMENT

[75] Inventor: Shinya Konishi, Hamamatsu, Japan

[73] Assignee: Kubushiki Kaisha Kawai Gakki Seisakusho, Hamamatsu, Japan

[21] Appl. No.: 765,750

[22] Filed: Sep. 26, 1991

[30] Foreign Application Priority Data

Sep. 27, 1990 [JP] Japan ................................ 2-255342
Sep. 29, 1990 [JP] Japan ................................ 2-258875

[51] Int. Cl.[5] ............................................ G09B 15/02

[52] U.S. Cl. ............................ 84/477 R; 84/464 R; 345/35

[58] Field of Search ............ 84/464 A, 464 R, 477 R; 340/753

[56] References Cited

U.S. PATENT DOCUMENTS 3,771,406 11/1973 Wheelweight ........................ 84/464
3,824,581 7/1974 Ohno ................................... 340/753
4,056,805 11/1977 Brady ................................ 84/464 R
5,048,390 9/1991 Adachi et al. .................... 84/464 R

*Primary Examiner*—Michael L. Gellner
*Assistant Examiner*—P. Stanzione
*Attorney, Agent, or Firm*—Joseph C. Mason, Jr.; Ronald E. Smith

[57] ABSTRACT

A display apparatus for an electronic musical instrument according to the first invention has a display section including multiple indicators provided in association with multiple tone parts, each indicator having multiple LEDs, a register section for reading out lighting time information from a memory which has lighting time information of the LEDs stored, and a counter section for performing a countdown operation in a predetermined time interval with the lighting time information in the register section as an initial value. When generation of a musical tone is instructed, the LEDs of the indicators which are associated with tone parts of the musical tone and whose quantity corresponds to volume information of the musical tone, are lit. When a count value of the counter section reaches zero, one of the LEDs is turned off or on, and the lighting time information in the register section is reset in the counter section to re-start a countdown operation. The tone levels for the individual parts are also displayed.

A display apparatus for an electronic musical instrument according to the second invention has a display section including multiple indicators provided in association with multiple tone parts, each indicator having multiple LEDs. At the time of displaying the tone level, the activation/deactivation of the LEDs is controlled display in a first display mode. At the time of displaying the volume level associated with a change in volume, the activation/deactivation of the LEDs is controlled display in a second display mode.

16 Claims, 21 Drawing Sheets

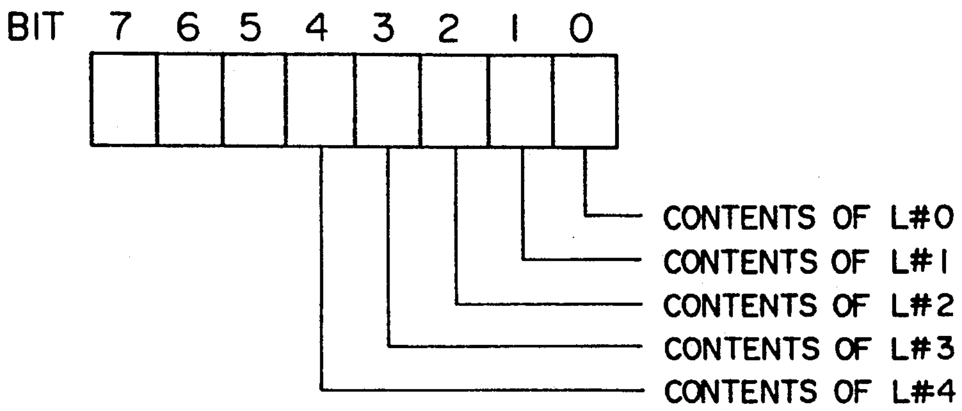
FIG. 9
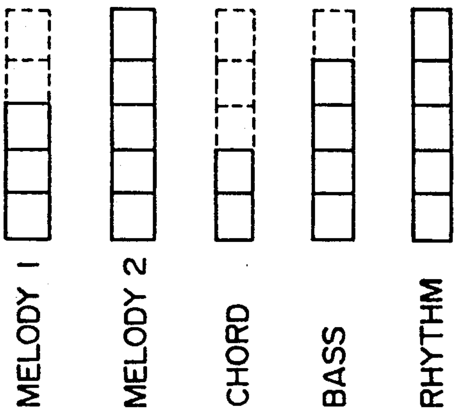
FIG. 10
| TIMBRE | T1 (KEY DEPRESSIN) | T2 (KEY RELEASE) |
|---|---|---|
| PIANO | $20_H$ | $20_H$ |
| ORGAN | $FF_H$ | $05_H$ |
FIG. 11

DISPLAY APPARATUS FOR ELECTRONIC MUSICAL INSTRUMENT

BACKGROUND OF THE INVENTION

1. Field of the Invention

The present invention relates to a display apparatus for electronic musical instruments, such as a synthesizer, an electronic piano, an electronic organ and a single keyboard, and more particularly, to a display apparatus for electronic musical instruments which displays the levels of tone signals by lighting the associated number of light-emitting elements.

2. Description of the Related Art

Among the known display apparatuses provided in electronic musical instruments, there is a level meter which displays the output signal level of a musical tone. This level meter, provided for each of right and left channels, presents visual confirmation of the tone volumes to help a user adjust the balance of the right and left volumes.

Such a level meter has a line of multiple light-emitting elements. The level of an analog tone signal generated by tone generator means is detected by a known level detector, and the number of light-emitting elements in the level meter that should be lit is controlled in accordance with the detection result. Consequently, the level of a tone signal which is being released as a musical sound can be visually confirmed.

Conventional electronic musical instruments are typically designed so that the tone generator means has a plurality of individual tone parts, such as melody, bass, chord and rhythm. The individual parts are finally mixed into tone signals for two (right and left) channels, or into tone signals for four (front, rear, right and left) channels (these tone signals will be called "output parts"), and the tone signals are then released from loudspeakers.

The level meter is also provided for each output part to display the output signal level of a musical tone for the associated output part.

Particularly, however, electronic musical instruments are often played to feature a predetermined part or to provide the optimal balance for an intended piece of music by adjusting the volumes of individual parts. There is therefore a strong demand to provide a display apparatus for an electronic musical instrument with the ability to present visual confirmation of the volume of the individual tone parts.

As an easy solution to this demand, the level display apparatus may be designed to display the signal level for each individual tone part. But, providing the output part for each individual tone part definitely increases the amount of required hardware, undesirably making the display apparatus expensive.

When the tone volume provided for each part is manipulated or when the display apparatus receives volume information from an automatic playing device, it is not possible to see what level the volume of that part is in.

The tone-ON level at the time a key is depressed (key-On time) of course depends on volume information from the tone volume or an automatic playing device, but also reflects other various factors concerning the strength of the musical tone, such as the velocity and accent information according to the strength of hitting the key. It is therefore difficult for the user to accurately recognize the tone volume level of a presently-playing part to properly control the volume balance between individual tone parts.

SUMMARY OF THE INVENTION

It is therefore a primary object of the present invention to provide a simple and inexpensive display apparatus for an electronic musical instrument which can display the output signal level of a musical tone for each tone part irrespective of the output parts.

It is another object of the present invention to provide a display apparatus for an electronic musical instrument which permits a user to know the volume level of each part when the tone volume is operated or volume information from an automatic playing device is received.

To achieve the first object, a display apparatus for an electronic musical instrument according to the first invention comprises a display section including multiple indicators provided in association with multiple tone parts, each indicator having multiple display elements; a memory for storing lighting time information of the display elements constituting each indicator of the display section, in association with multiple timbres; a register section for reading out the lighting time information from the memory and registering the lighting time information when a predetermined timbre is selected; a counter section for performing a counting operation in a predetermined time interval with the lighting time information registered in the register section as an initial value; and a control section for, when generation of a musical tone is instructed, lighting those of the display elements of the indicators of the display section which are associated with tone parts of the musical tone and whose quantity corresponds to volume information of the musical tone, and for turning off one of the display elements when a count value of the counter section reaches a predetermined value and setting the lighting time information held in the register section again in the counter section to re-start a counting operation.

When tone generation is instructed, for each of the individual tone parts for the musical tone to be generated, the display apparatus permits the display section to display the initial value corresponding to the intended volume, and turns off the display elements of the associated indicator one by one in accordance with the lighting time information stored in the memory thereafter.

To achieve the second object, a display apparatus for an electronic musical instrument according to the second invention comprises a display section including multiple indicators provided in association with multiple tone parts, each indicator having multiple display elements; a first control section for controlling activation/deactivation of the display elements constituting each indicator of the display section to permit a display in a first display mode according to a tone level; and a second control section for controlling activation/deactivation of the display elements constituting each indicator of the display section to permit a display in a second display mode according to a volume level.

According to this invention, upon reception of information about generation of a musical tone from a keyboard or an automatic playing device, for example, the display apparatus causes the display section to provide a display in the first mode corresponding to the tone level of the specified musical tone. When receiving information from a tone volume on an operation panel or volume information from an automatic playing device, for example, the display apparatus causes the display section to provide a display in the second mode different from the first mode and corresponding to the volume level.

As the same display section is used to display both the tone level and the volume level, the former level in the first mode and the latter in the second mode, a user can know the tone level as well as the correct volume level.

BRIEF DESCRIPTION OF THE DRAWINGS

FIG. 9 is a diagram showing the structure of a display buffer according to the first embodiment of the first invention;

FIG. 10 is a diagram exemplifying what is displayed by the display apparatus according to the first embodiment of the first invention;

FIG. 11 is a diagram for explaining a count initial value according to the first embodiment of the first invention;

DETAILED DESCRIPTION OF THE PREFERRED EMBODIMENTS

Embodiments of First Invention

Figure 1:
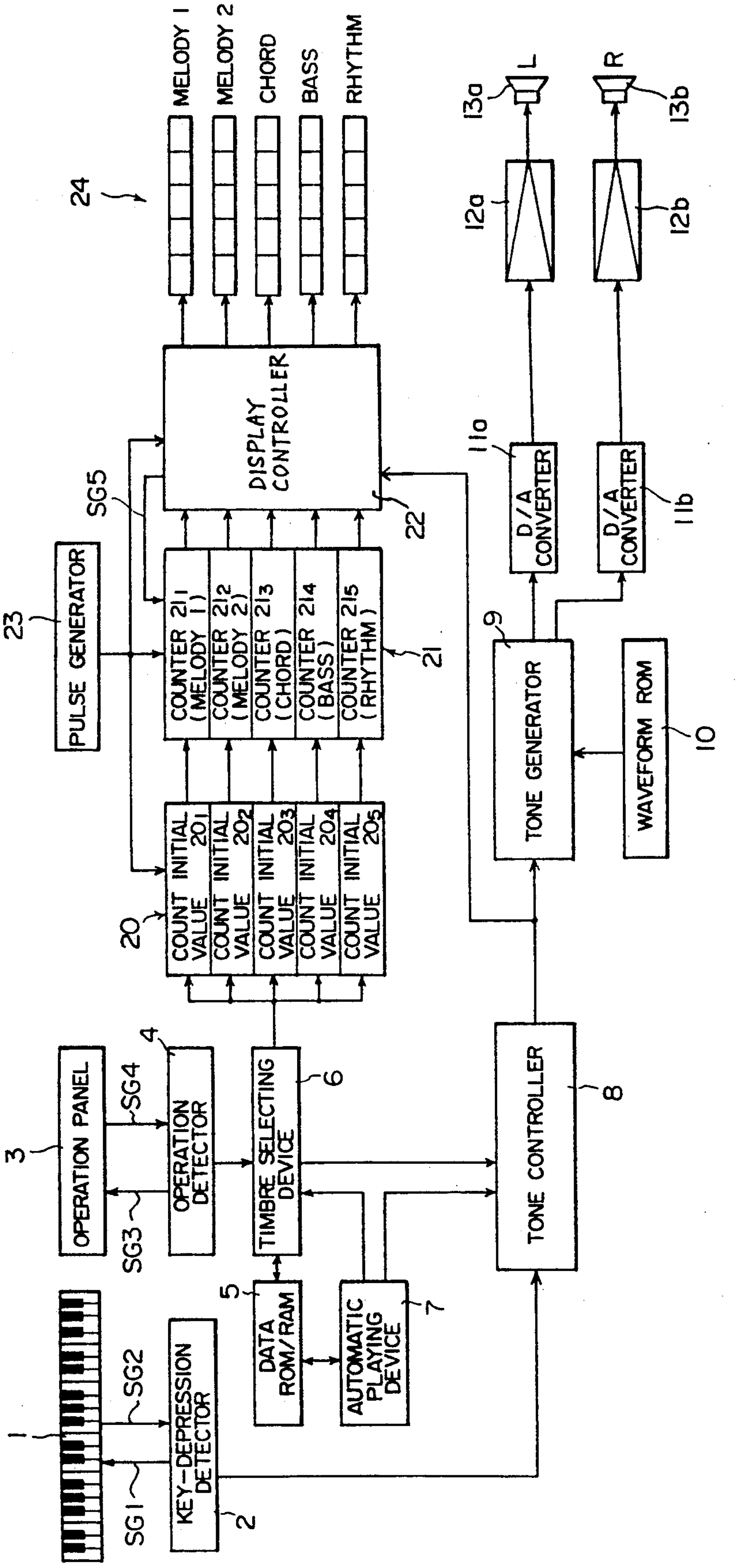
FIG. 1 is a block diagram illustrating the general structure of an electronic musical instrument to which a display apparatus according to the first invention is applied.

FIG. 1 is a block diagram illustrating the general structure of an electronic musical instrument to which a display apparatus according to the first invention is applied.

Referring to FIG. 1, a keyboard 1 is provided with a matrix of switches (not shown) which are opened and closed in response to depression and releasing of the associated keys.

A key-depression detector 2 sends out a scan signal SG1 to the keyboard 1, and receives data SG2 representing key-On/key-OFF sent from the switch matrix of the keyboard 1 in synchronism with the scan signal SG1. The key-depression detector 2 supplies the received data SG2 to a tone controller 8 (which will be described later) for tone generation.

An operation panel 3 is provided with various switches (not shown), such as a timbre select switch, a mode switch and a rhythm select switch.

An operation detector 4 sends a scan signal SG3 to the operation panel 3, and receives data SG4 representing ON/OFF of a switch sent from the operation panel 3 in synchronism with the scan signal SG3. The received data SG4 is then supplied to a timbre selecting device 6.

A data ROM/RAM 5 stores various data, such as automatic play data, timbre information (tone information, envelope information), needed for tone generation in addition to a program that controls the electronic musical instrument. The details of the contents of this data ROM/RAM 5 will be given later.

The timbre selecting device 6 reads out timbre information from the data ROM/RAM 5 in accordance with timbre change information sent via the operation detector 4 from the operation panel 3 or the timbre change information acquired from an automatic playing device 7 to be described later, and supplies it to the tone controller 8. The timbre selecting device 6 also supplies "display time information" (see FIG. 3) included in the timbre information read out from the data ROM/RAM 5 to a register section 20.

The automatic playing device 7 reads out automatic play data from the data ROM/RAM 5 and sends it to the tone controller 8, and sends timbre information to the timbre selecting device 6 when the automatic play data specifies the timbre information.

This creates the same conditions as provided when the keyboard 1 or the operation panel 3 is operated, ensuring automatic music performance.

The tone controller 8 assigns a tone-ON channel in accordance with key information sent via the key-depression detector 2 from the keyboard 1, and sends out data according to the timbre selected by the timbre selecting device 6 to the tone generator 9. Data (velocity, pitch, volume, etc.) about tone volume from this tone controller 8 is also supplied to a display controller 22 which will be described later.

In accordance with various parameters sent from the tone controller 8, the tone generator (tone source) 9 reads out the associated wave data from a wave ROM 10, and produces digital tone signals of two output systems (right and left channels). The digital tone signals from the tone generator 9 are respectively sent to D/A converters 11*a* and 11*b*.

The wave ROM 10 stores wave data in accordance with various timbres, pitches, etc. Of the wave data stored in the wave ROM 10, that data which is stored in an area specified by a waveform reading head address (see FIG. 3) stored in the data ROM/RAM 5 is read out at the velocity according to the pitch specified by the keyboard 1, thereby producing the desired digital tone signal.

The D/A converter 11*a* is for the left channel, while the D/A converter 11*b* is for the right channel. The D/A converters 11*a* and 11*b* each serve to convert an input digital tone signal into an analog tone single. The analog tone signals from the D/A converters 11*a* and 11*b* are respectively supplied to amplifiers 12*a* and 12*b*.

The amplifiers 12*a* and 12*b* amplify the input analog tone signals, and supply the amplified tone signals to sound systems 13*a* and 13*b*, respectively.

The sound systems 13*a* and 13*b*, which may be loudspeakers, headphones, or the like, convert the received tone signals into acoustic signals and release them.

The register section 20 stores display time information included in the timbre information stored in the data ROM/RAM 5. This register section 20 comprises five count initial value registers $20_1$ to $20_5$ in association with individual tone parts, namely, melody 1, melody 2, chord, bass and rhythm. The contents of this register section 20 are set in a counter section 21.

The counter section 21 counts down from the set data (display time value). This counter section 21 likewise comprises five counters $21_1$ to $21_5$ for the respective tone parts (melody 1, melody 2, chord, bass and rhythm). The counters $21_1$ to $21_5$ are initialized with the contents of the respective registers $20_1$ to $20_5$ in response to a control signal SG5 from the display controller 22. The counter section 21 performs a countdown operation in synchronism with a pulse signal from a pulse generator 23 to be described later. The contents of the counter section 21 are supplied to the display controller 22.

The display controller 22 controls activation and deactivation of a display apparatus 24. In other words, the display controller 22 performs such control as to activate the display apparatus 24 in accordance with data about the volume from the tone controller 8, and deactivate the display apparatus 24 in accordance with the contents of the counter section 21.

The pulse generator 23 produces a count pulse for the counter section 21. This pulse generator 23 is used as a timer circuit which issues an interruption for each given period of time, for example. The interrupt signal from this timer circuit is used as a count signal.

The display apparatus 24 likewise comprises five indicators $24_1$ to $24_5$ in association with the individual tone parts (melody 1, melody 2, chord, bass and rhythm). Each of the indicators $24_1$-$24_5$ has a row of five light-emitting elements L#0 to L#4, which can be activated or deactivated independently. The light-emitting elements may be constituted of LEDs (Light Emitting Diodes).

Figure 2:
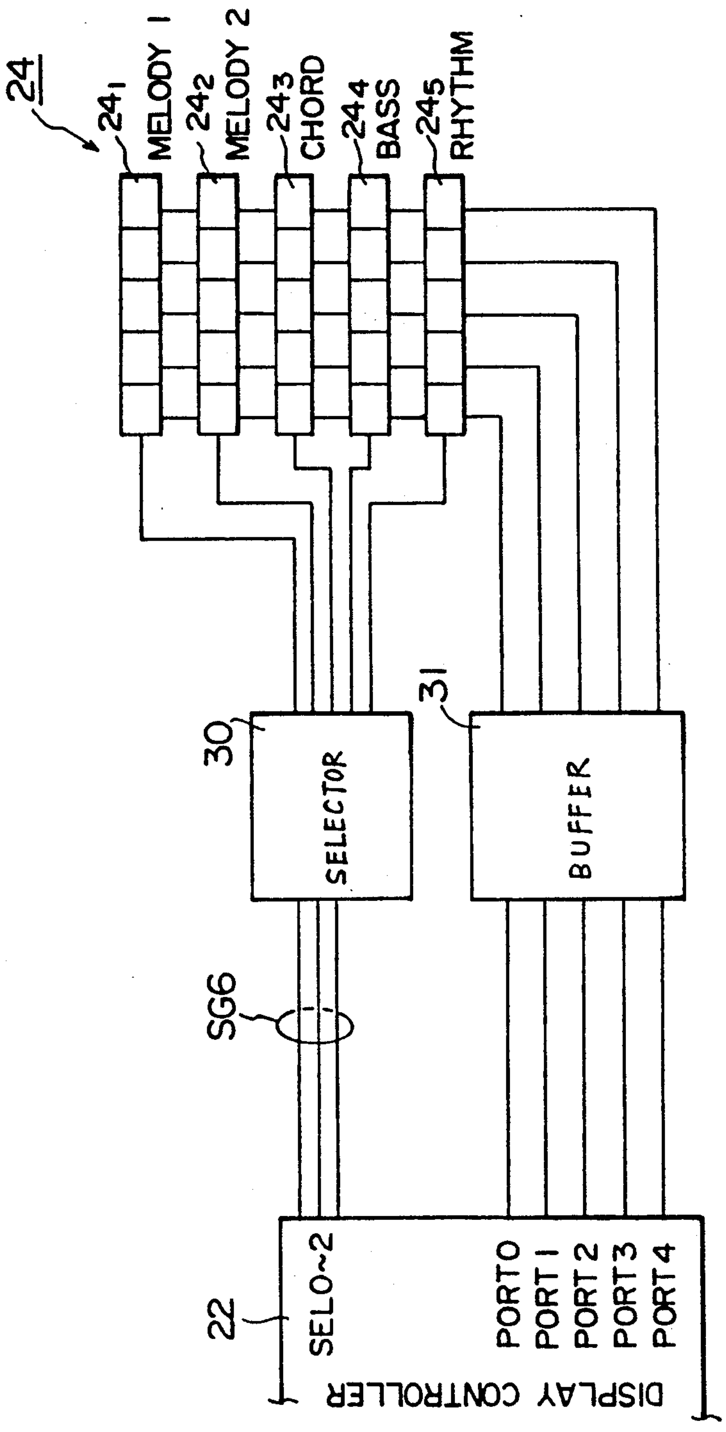
FIG. 2 is a detailed block diagram showing the structure between a display controller and the display apparatus according to the first and second inventions.

FIG. 2 is a detailed block diagram showing the structure between the display controller 22 and the display apparatus 24.

Referring to FIG. 2, the display controller 22 has control signal output terminals SEL0 to SEL2 from which a select signal SG6 for selecting one of the five indicators $24_1$-$24_5$ is output. Display data is output from output ports PORT0 to PORT4.

A selector 30 decodes the control signal SG6 from the control signal output terminals SEL0-SEL2 of the display controller 22, and sends an enable signal to one of the indicators $24_1$-$24_5$.

A buffer 31 receives the display data from the output ports PORT0-PORT4 of the display controller 22 and drives the individual light-emitting elements L#0-L#4 of each of the indicators $24_1$-$24_5$.

While the key-depression detector 2, operation detector 4, timbre selecting device 6, automatic playing device 7, tone controller 8 and display controller 22 in this embodiment are realized by hardware, they may be realized instead by the functions of a central processing unit (CPU) such as a microprocessor.

Further, while the register section 20 for count initial values and the counter section 21 may both be realized by hardware, they may be realized by registers and counters provided in a memory.

The operation of the display apparatus with the above-described structure will now be explained.

Figure 3:
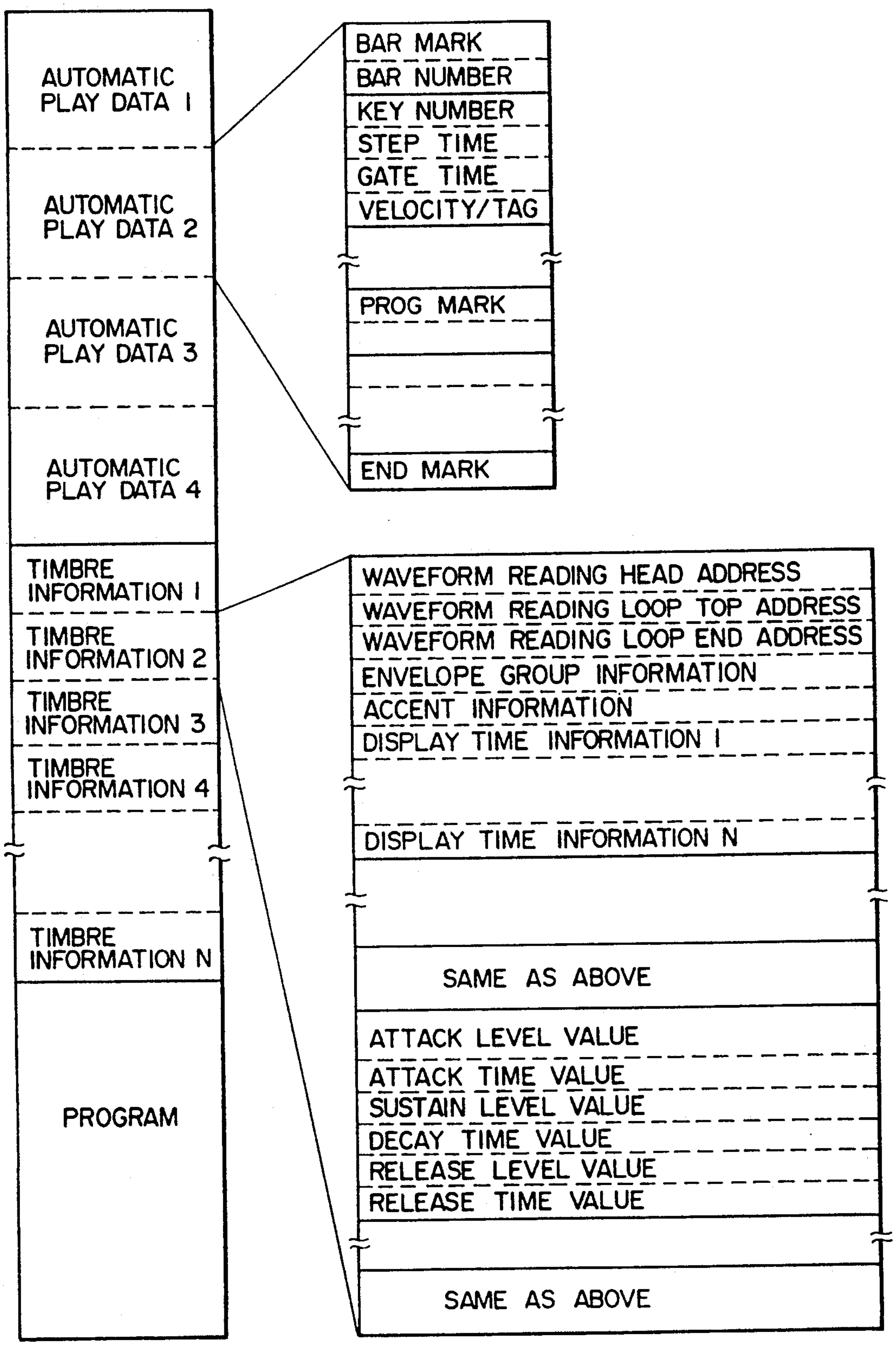
FIG. 3 is a diagram depicting a storage format of a data ROM/RAM according to a first embodiment of the first invention.

FIG. 3 exemplifies the storage format of a data ROM/RAM 5 according to this embodiment. As illustrated, automatic play data 1 to 4, timbre information 1 to N and a program are stored in the data ROM/RAM 5.

The automatic play data is what the automatic playing device 7 reads out for automatic music performance. The automatic play data includes a bar mark and bar number as bar information, a key number, step time, gate time and velocity/TAG as tone-ON information, and a PROG mark and timbre number as timbre information, with an end mark at the end of the data to indicate the end of the play data. The "TAG" is used to specify tone part information.

The timbre information consists of tone information and envelope information.

The tone information includes a waveform reading head address, waveform reading loop top address, waveform reading loop end address, envelope group information, accent information, and display time information 1−N which are directly concerned with the features of this invention.

The envelope information includes an attack level value, attack time value, sustain level value, decay time value, release level value and release time value.

The data in the data ROM/RAM 5 also includes what is not directly concerned with the present invention. The details of individual pieces of data will be given hereunder whenever necessary.

Figure 4:
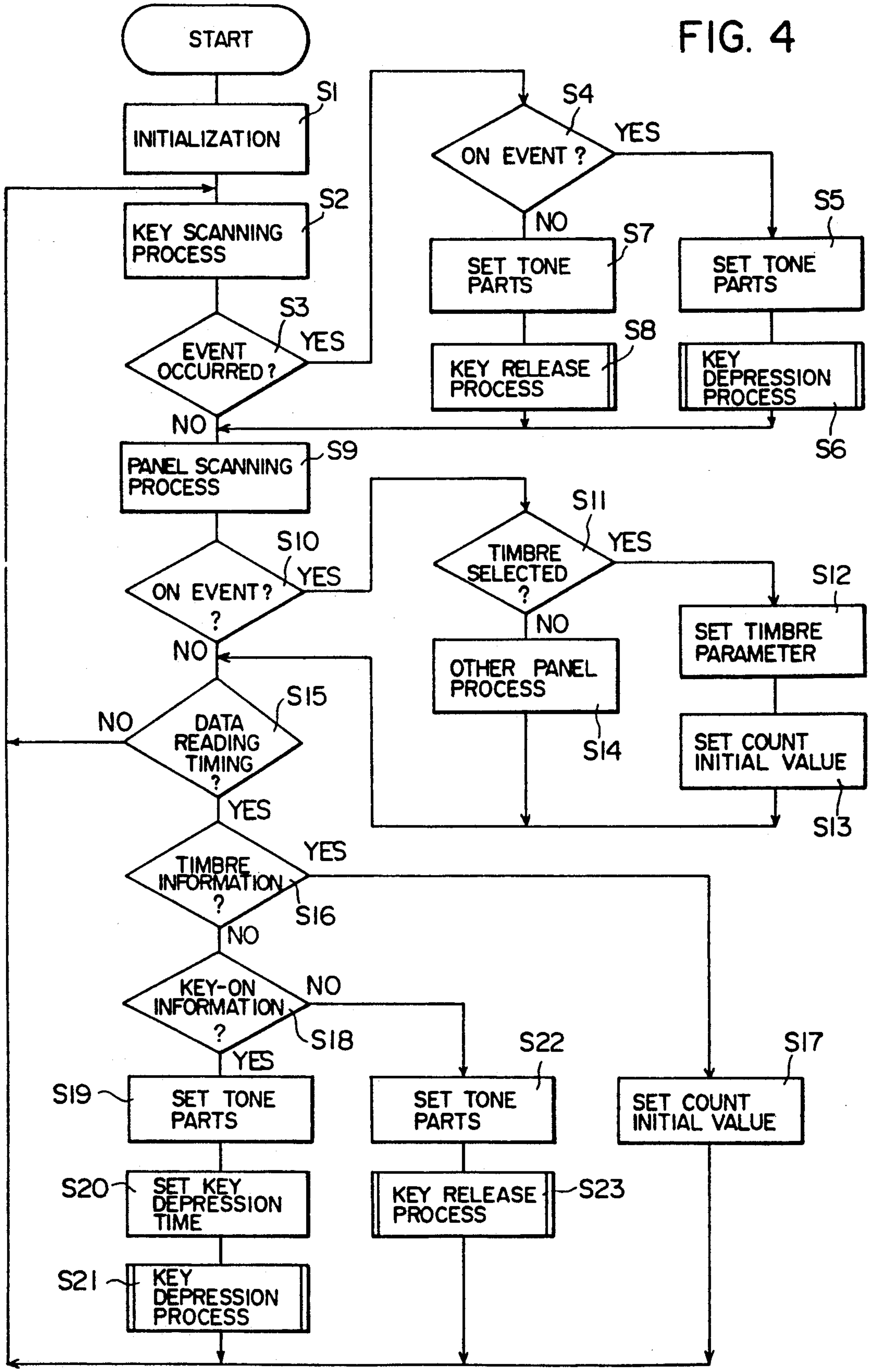
FIG. 4 is a main flowchart illustrating the operation of the first embodiment of the first invention.

FIG. 4 illustrates the main routine for the operation of an electronic musical instrument to which the display apparatus according to the first embodiment of the first invention is applied.

First, the tone controller 8 performs initialization (step S1). In the initialization the register section 20 and the counter section 21 are initialized and a predetermined initial value is set in a work RAM (not shown).

Then, a key process (steps S2 to S8) is executed. In the key process, first a key scanning process is performed (step S2). That is, the tone controller 8 fetches data representing a key-depression status of the keyboard 1, detected by the key-depression detector 2.

It is then checked whether or not the fetched data shows the occurrence of any event, i.e., whether there is key depression or key release (step S3). If it is determined that an event has occurred, it is then checked if this event is an ON event or key depression (step S4). If the event is judged to be an ON event, tone parts associated with the key depression are set in the buffer (not shown) (step S5). That is, the tone parts are set in accordance with the key area and playing mode. Then, a key depression process associated with the depressed key is carried out (step S6); the details of this key depression process will be given later.

When the event is not determined as an ON event in step S4, it is considered as an OFF event, the associated tone parts are set (step S7) as in step S5, and a key release process associated with the released key is executed (step S8). The details of this key release process will also be given later.

When it is determined in step S3 that no event has occurred, a panel process (steps S9 to S14) is performed. In this panel process, first, a panel scanning process is conducted (step S9). In other words, the tone controller 8 fetches data representing the set statuses of the switches on the operation panel 3, detected by the operation detector 4. It is then checked whether or not the fetched data shows the occurrence of any event, i.e., whether any switch on the operation panel 3 has been rendered ON or OFF (step S10). If it is determined that an event has occurred, it is then checked if the event is timbre selection or the timbre select switch (not shown) has been operated (step S11). If it is judged as the timbre selection, the timbre selecting device 6 reads out timbre information associated with the timbre number selected by the timbre select switch from the data ROM/RAM 5, and sets it as a timbre parameter in the tone controller 8 (step S12). Then, a count initial value is set in the register section 20 (step S13); this count initial value is display time information in the timbre information stored in the data ROM/RAM 5.

When the event is not determined as timbre selection in step S11, a panel process associated with the switch selected through the panel operation is performed (step S14).

When it is determined in step S10 that no event has occurred, it is checked whether or not the timing for reading automatic play data has arrived (step S15). If it is not the data reading timing, the flow returns to step S2 and the sequence of processes described above will be repeated.

If it is determined in step S15 that the data reading timing has arrived, an automatic play process (steps S16 to S23) is executed.

In the automatic play process, first, it is checked if the read-out play data is timbre information (step S16). If it is the timbre information, a count initial value is set in the register section 20 (step S17). This process is the same as is done in step S13. In other words, timbre information specified by the timbre number included in the automatic play data is read out from the data ROM/RAM 5, and display time information included in the timbre information is set as the count initial value in the register section 20. Then, the flow returns to step S2 and the above-described sequence of processes will be repeated.

If it is not judged in step S16 that the play data is timbre information, it is then checked whether the read-out data is key-ON information (step S18). When it is the key-ON information, tone parts are set (step S19), a key depression time is set (step S20), and a key depression process is performed (step S21). Then, the flow returns to step S2 and the above-described sequence of processes will be repeated.

When it is determined in step S18 that the read-out data is not key-ON information, it is considered as key-OFF information, and a tone-part setting process (step S22), and a key release process (step S23) are performed. Then, the flow returns to step S2 and the above-described sequence of processes will be repeated.

Through the process sequence, the normal playing or automatic playing will be performed in accordance with the operation of the keyboard 1 or the operation panel 3.

Figure 5:
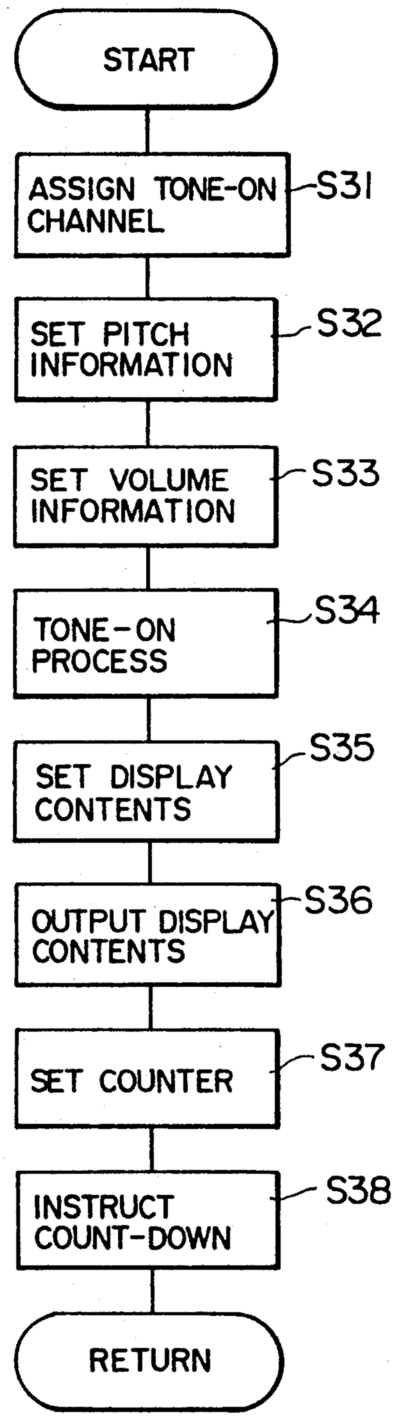
FIG. 5 is a flowchart illustrating a key depression process in FIG. 4.

FIG. 5 is a detailed flowchart illustrating the key depression process to be performed in steps S6 and S21 in FIG. 4.

First, a tone-ON channel is assigned in the key depression process (step S31). More specifically, multiple channels which the tone generator 9 has are searched for an empty channel, and if no empty channel is found, tone generation from a predetermined channel is terminated according to given rules to thereby determine a channel to generate a musical tone corresponding to the depressed key.

Pitch information is then set in a predetermined buffer (step S32). The pitch information includes note information, transpose information and information for adjusting delicate pitches.

Volume information is set in a predetermined buffer (step S33). The volume information is the value which is determined based on touch (velocity) information, accent information for every timbre, etc. The volume information is expressed by 128 levels from $00_H$ to $7F_H$. ("$_H$" indicates a hexadecimal number. The same is true hereunder.) This volume information is set for each tone part.

When setting these parameters is completed, the contents of the buffers are supplied to the tone generator 9, which generates musical tones (step S34). The musical tones are then released from the sound systems 13*a* and 13*b*.

After the tone generation is completed, display contents are set to a display buffer (step S35). In this process, a bit map corresponding to the volume information is set in the display buffer.

The display buffer is provided in the work RAM (not shown). As shown in FIG. 9, the display buffer has a single-byte structure consisting of eight bits for each tone part, the lower five bits corresponding to light-emitting elements L#0 to L#4 of the associated indicator.

In the process of setting the display contents, the display buffer is set in accordance with the volume information as follows:

(1) volume information $00_H$ . . . clear all bits to 0
(2) volume information $01_H$–$1F_H$ . . . set bit 0
(3) volume information $20_H$–$4F_H$ . . . set bits 0 and 1
(4) volume information $50_H$–$5F_H$ . . . set bits 0–2
(5) volume information $60_H$–$6F_H$ set bits 0–3
(6) volume information $70_H$–$7F_H$ set bits 0–4

A process for outputting the display contents is then performed (step S36). The display contents prepared in step S35 are supplied from output ports PORT 0 to 4 of the display controller 22 via the buffer 31 to the display apparatus 24. One of the indicators $24_1$ to $24_5$, selected by the selector 30, is to be lit according to the contents of the buffer 31.

Then, a counter setting process is performed (step S37). The contents of those count initial value registers 20 which are associated with the tone parts already stored in the buffer in the tone-part setting process in the main routine, are set in the corresponding counters 21.

Then, countdown of the values in the counters 21 is instructed (step S38). The countdown operation is executed upon each generation of a count pulse from the pulse generator 23, i.e., upon each interruption.

Figure 6:
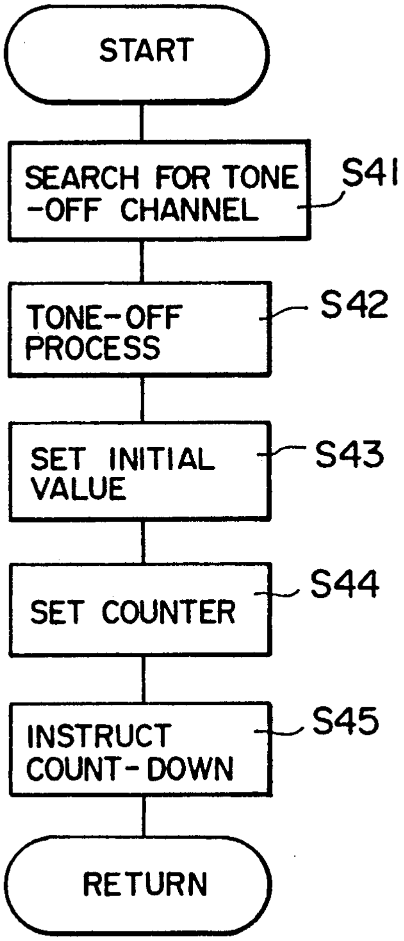
FIG. 6 is a flowchart illustrating a key release process in FIG. 4.

FIG. 6 is a detailed flowchart illustrating the key release process which is performed in steps S8 and S23 in FIG. 4.

Searching for a tone-OFF channel is performed first in the key release process (step S41). The tone-ON channels in the tone generator 9 are searched for a channel corresponding to the released key.

A tone-OFF process is performed on a searched channel (step S42). In other words, a tone-OFF instruction is sent to the tone generator 9.

Releasing musical tones from the sound systems 13*a* and 13*b* are to be disabled.

When the tone-OFF process is completed, initial-value setting is performed (step S43). In this process, a count initial value at the time of key release is set in the register section 20. A counter setting process is then performed (step S44). The contents of those count initial value registers 20 which are associated with the tone parts already stored in the buffer in the tone-part setting process in the main routine, are set to the corresponding counters 21.

Countdown of the values in the counter section 21 is then instructed (step S45). As a result, a countdown operation is performed upon each generation of a count pulse from the pulse generator 23, i.e., upon each interruption.

Figure 7:
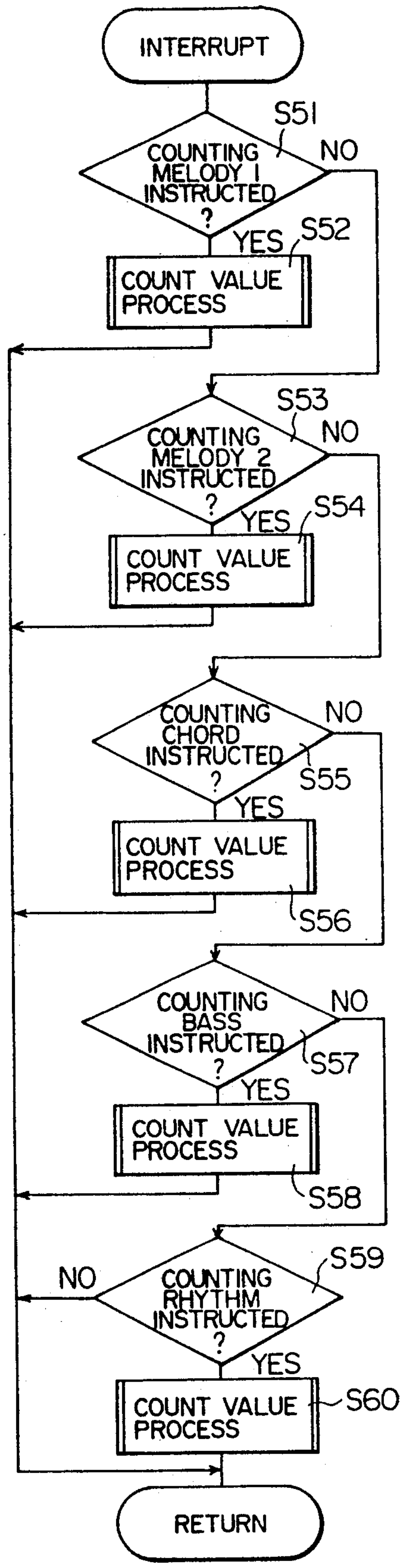
FIG. 7 is a flowchart illustrating an interrupt process according to the first embodiment and a second embodiment of the first invention.

FIG. 7 presents a detailed flowchart of an interrupt process. The interrupt routine is invoked by an interrupt signal from the timer circuit (not shown), which is equivalent to the pulse generator 23 shown in FIG. 1.

As shown in FIG. 7, it is determined first whether or not counting for a melody 1 is instructed, i.e., if the counter $21_1$ is in operation (step S51), referring to tone part information which is stored in a predetermined buffer. When the counter $21_1$ is judged to be in operation, a subroutine for a count value process shown in FIG. 8 is called (step S52).

Figure 8:
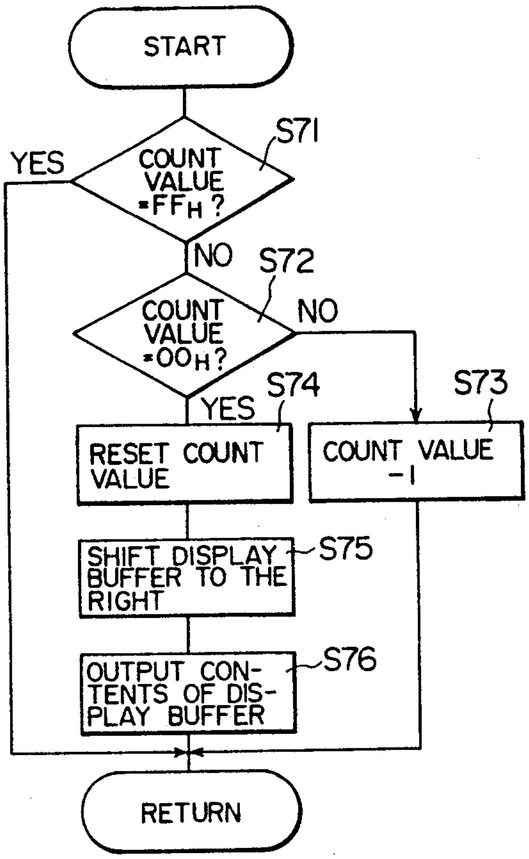
FIG. 8 is a flowchart illustrating a count value process in FIG. 7 according to the first embodiment of the first invention.

In this subroutine, it is determined first if the current count value of the counter $21_1$ is "$FF_H$," as shown in FIG. 8 (step S71). When the count value is "$FF_H$," the flow returns to the main routine without performing the rest of the processes. The count value "$FF_H$" is a special code for instructing that the countdown operation should not be performed. The count value "$FF_H$" is used when sustain sounds from a musical instrument such as an organ are generated. While this code "$FF_H$" is set, the countdown is not performed and the content of the counter $21_1$ are altered only by a key release.

When it is judged in step S71 that the count value is not "$FF_H$," it is then determined whether or not that value is "$00_H$" (step S72). If that count value is not "$00_H$," the contents of the counter $21_1$ are decremented (step S73), and the flow returns from the subroutine to the main routine.

If it is judged in step S72 that the count value is "$00_H$," the count value is set again (step S74). That is, what is held in the count initial value register $20_1$ is set in the corresponding counter $21_1$.

The contents of the display buffer are shifted to the right by one bit (step S75), and are then output (step S76). This renders off one of the light-emitting elements which appear activated in the indicator $24_1$.

Returning to the explanation about the flowchart in FIG. 7, when it is judged in step S51 that counting for the melody 1 has not been instructed, it is then determined whether counting for a melody 2 is instructed, i.e., if the counter $21_2$ is in operation (step S53). When the counter $21_2$ is functioning, the subroutine for the count value process in FIG. 8 is called (step S54). The operation of this subroutine will not be discussed below because it is the same as the one described above, except that the counter $21_2$ corresponding to the melody 2 is involved.

The counting operation is performed on a chord, bass and rhythm in the same manner as done on the melody, and the contents of the counters $21_3$ to $21_5$ are updated.

The display modes of the display apparatus 24 will now be explained to help understand the above description.

FIG. 10 exemplifies what is displayed by the display apparatus 24, where volumes are displayed independently for the individual tone parts (melodies 1 and 2, chord, base and rhythm).

The solid lines show the activated light-emitting elements, and the broken lines the deactivated light-emitting elements.

FIG. 11 exemplifies the count initial values when the volumes of a piano as a typical attenuating sound system and an organ as a typical sustain sound system are to be displayed.

In the case of the attenuating sound system, a count initial value T1 at the time of key depression is equal to a count initial value T2 at the time of key release, for example "$20_H$." Upon each passage of a "$20_H$" time from the point of the key depression or key release, the light-emitting elements are turned off one by one.

In the case of the sustain sound system, for example, the count initial value T1 at the time of key depression is "$FF_H$" while the value T2 at the time of key release is "$05_H$."

"$FF_H$," the count initial value at the time of key depression, is a special value as described above. When this value is set in the individual counters 21, the values of the counters are not decremented (see FIG. 8). The display apparatus 24, once activated, resumes its state until some key is released.

The count initial value T2 at the time of key release is very small, and the ON duration of a single light-emitting element is very short. The time from a point when all the light-emitting elements are lit to a point when they are turned off is therefore significantly short, so that it would appear that all the light-emitting elements are turned off simultaneously.

Figure 12:
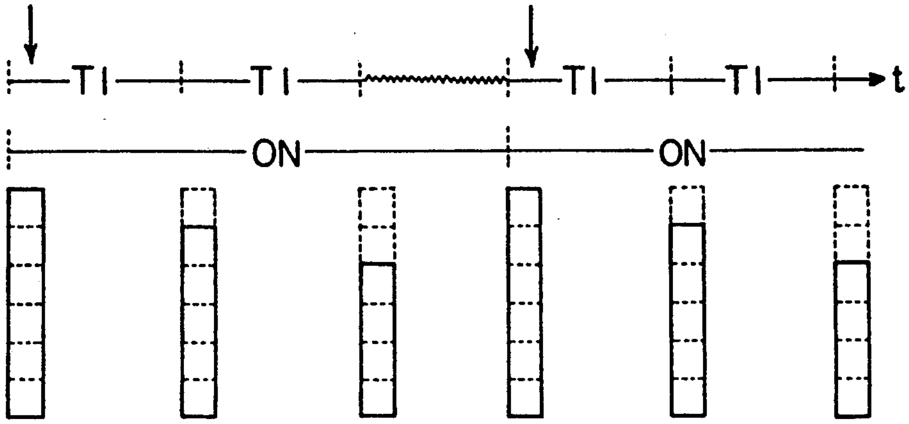
FIG. 12 is a diagram for explaining the relationship between the display state of a display apparatus of a attenuating sound system and a count initial value according to the first embodiment of the first invention.
Figure 13:
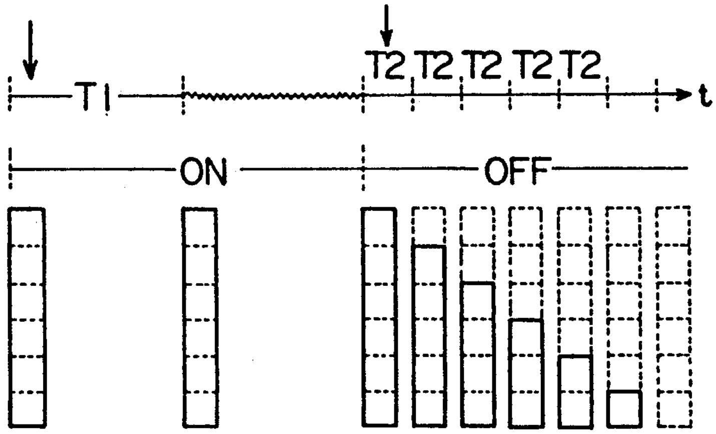
FIG. 13 is a diagram for explaining the relationship between the display state of a display apparatus of a sustain sound system and a count initial value according to the first embodiment of the first invention.

FIGS. 12 and 13 illustrate the relationship between the display mode of the display apparatus 24 and the count initial value.

In the case of the attenuating sound system, a predetermined number of light-emitting elements (five in this diagram) are lit in accordance with the volume at the time of key depression, as shown in FIG. 12. Then, the light-emitting elements are turned off one by one as each period of T1 elapses, indicating how an attenuating sound is attenuated.

In the case of the sustain sound system, a predetermined number of light-emitting elements (five in this diagram) are lit in accordance with the volume at the time of key depression, and this state continues until key release occurs, as shown in FIG. 13. After the key release, the light-emitting elements are rapidly turned off one by one. This shows how a sustain sound is sustained.

A modification of the storage format of the display time information will now be described.

Figure 14:
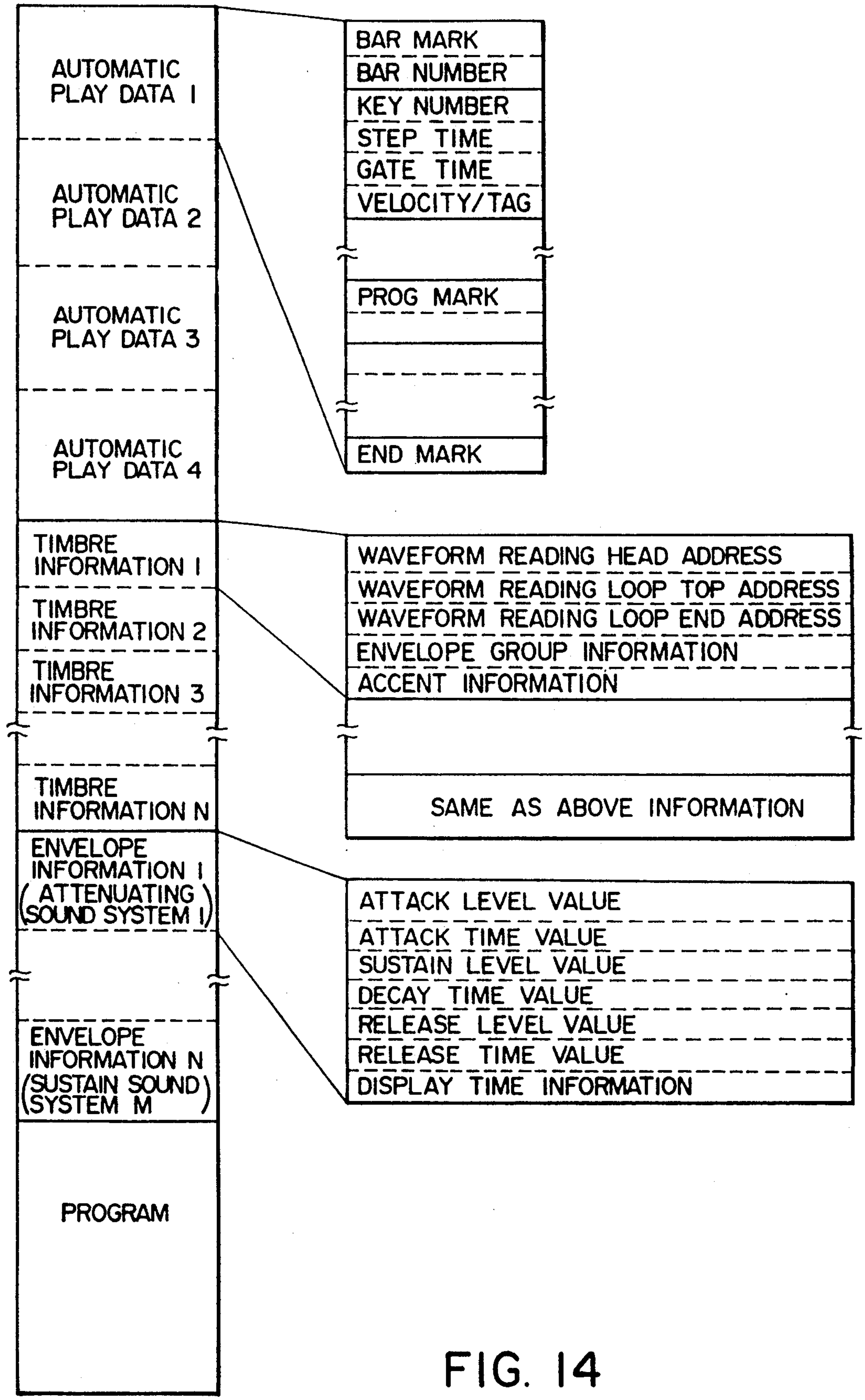
FIG. 14 is a diagram showing another storage format of the data ROM/RAM according to the first embodiment of the first invention.

FIG. 14 illustrates the data storage format of the data ROM/RAM 5 in this case.

Envelope information 1 to N are stored, divided into two parts for the attenuating sound system and sustain sound system, separately from timbre information 1 to N. The timbre information is structured so as to include only envelope group information pointing to the envelope information. Each piece of envelope information includes a single piece of display time information.

For the timbre selection, i.e., when a timbre is selected by the operation panel 3, or when data read from the automatic playing device 7 shows an instruction to change the timbre, the count initial value is set in the register section 20. At the same time, the corresponding envelope information is selected referring to the envelope group information in the tone information, and the display time information in the envelope information is read out and is set in the register section 20.

Since the other structure and the other operation are the same as those described above, their otherwise redundant explanation will be omitted.

With this structure, it is unnecessary to wait for the display time information for every timbre. Though the ROM has a small capacity, it is possible to display different time-dependent changes in tone signal level of the sustain sound system and the attenuating sound system.

The second embodiment of the first invention will now be described. According to the second embodiment, the envelope information prepared for each timbre is used as display time information (counter initial value).

Figure 15:
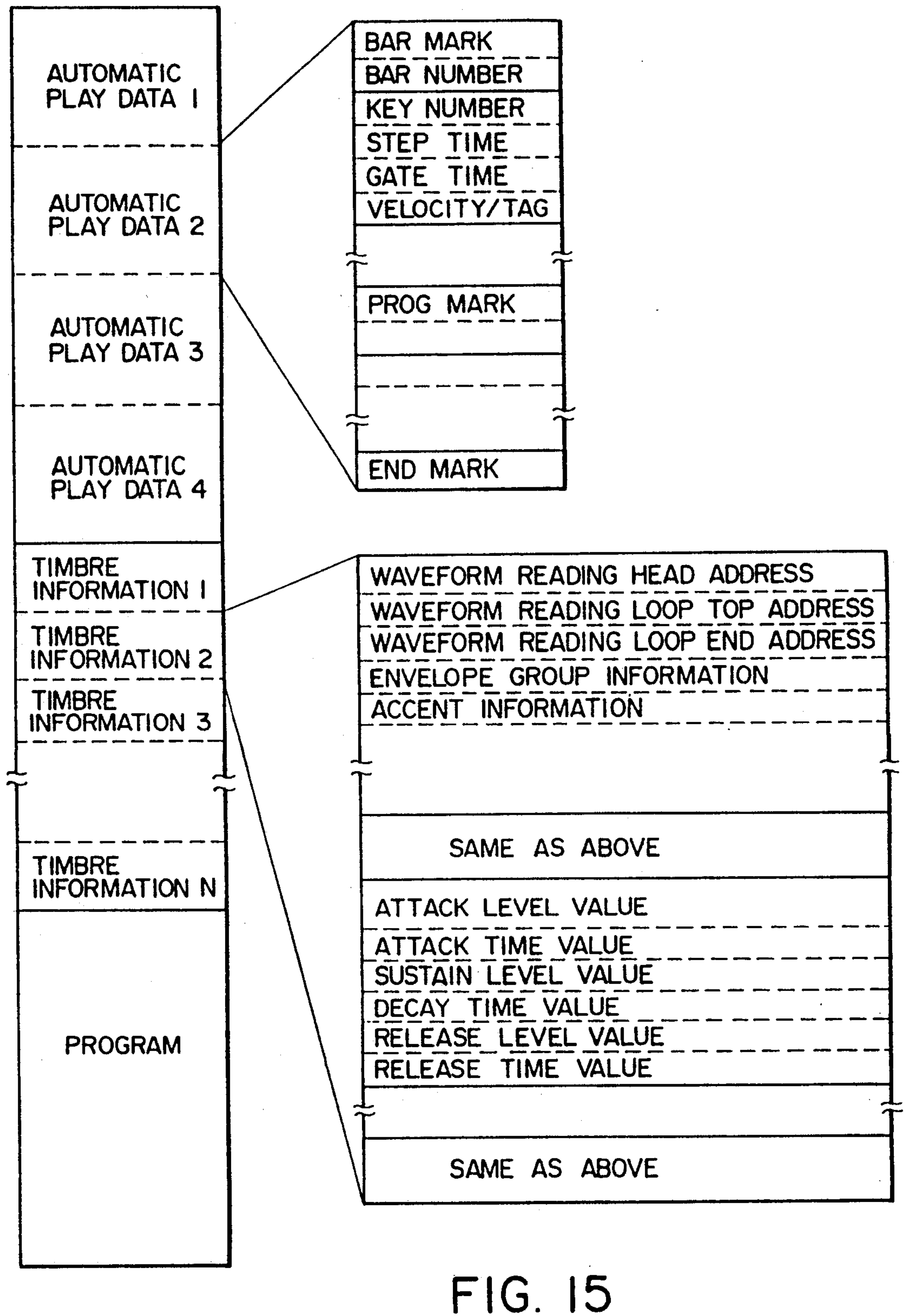
FIG. 15 is a diagram showing a storage format of a data ROM/RAM used in the second embodiment of the first invention and one embodiment of the second invention.

FIG. 15 illustrates the storage format of the data ROM/RAM 5 according to the second embodiment. This storage format differs from that shown in FIG. 3 in that the timbre information does not include display time information.

Figure 16:
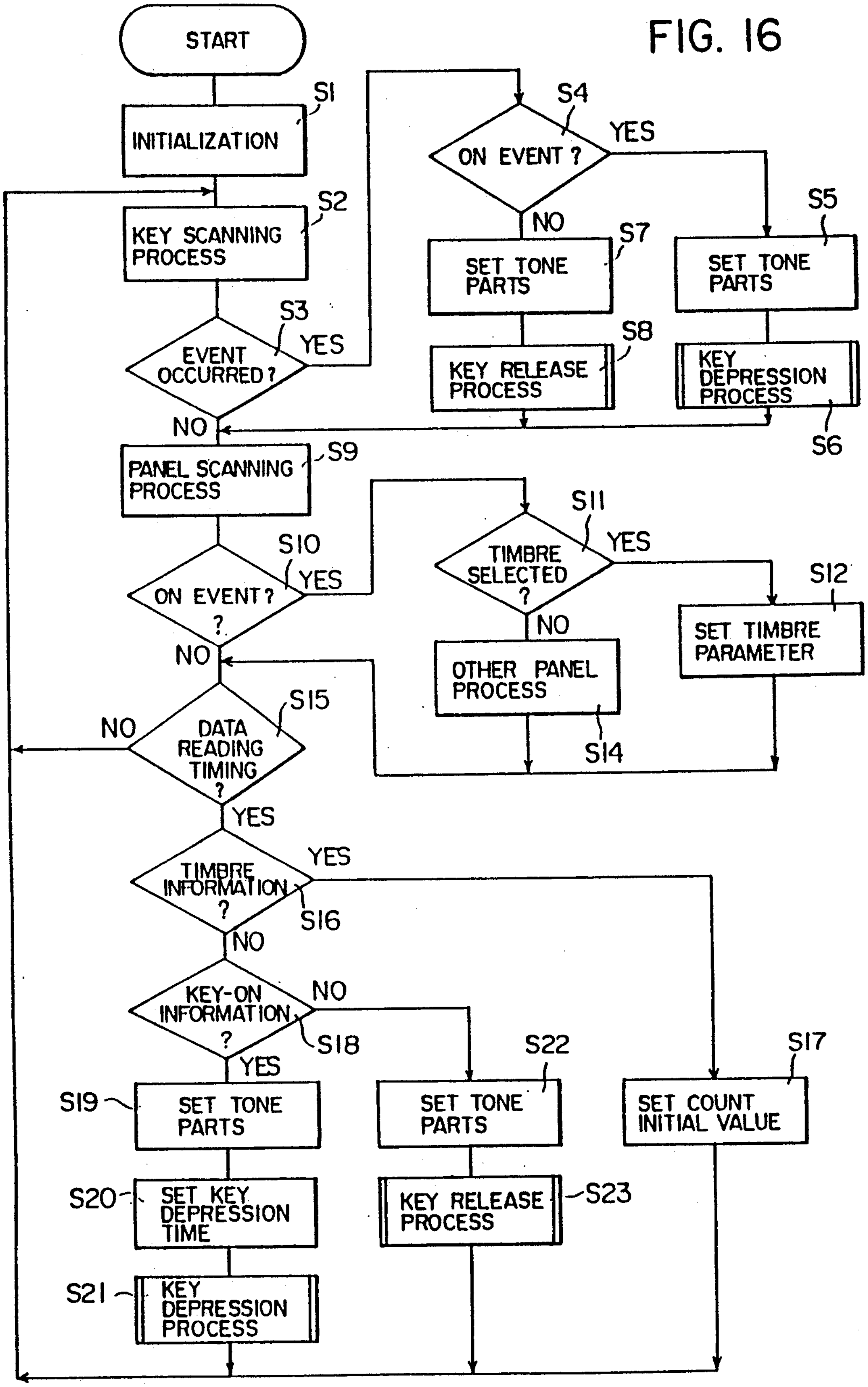
FIG. 16 is a main flowchart illustrating the operation of the second embodiment of the first invention.

FIG. 16 is a main flowchart of an electronic musical instrument according to the second embodiment.

Since this flowchart is almost identical to the one in FIG. 4, the same reference numerals as used in FIG. 4 will be given in FIG. 16 to specify identical or corresponding steps to thereby avoid their otherwise redundant description, and only the different portion will be explained.

This main flowchart differs from the one in FIG. 4 in that a process equivalent to step S13 in FIG. 4 is not performed. Though a timbre parameter is set based on the timbre selected by the operation of the operation panel 3 (step S12), a count initial value is not set in the register section 20. The count initial value is to be set according to envelope information. (The details will be given later.)

Figure 17:
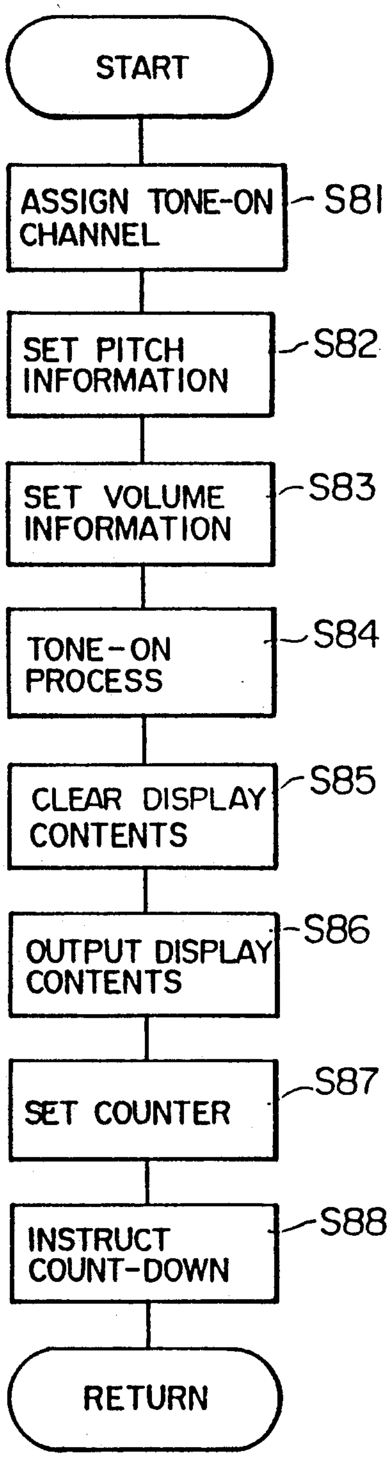
FIG. 17 is a flowchart illustrating a key depression process in FIG. 16.

FIG. 17 is a detailed flowchart of a key depression process to be performed in steps S6 and S21 in FIG. 16.

A sequence of processes from step S81 to step S84 in FIG. 17 is the same as the process sequence from step S31 to step S34 in FIG. 5, so its description will not be repeated below.

When a tone-ON process in step S84 is completed, the display contents will be cleared (step S85). This process is to clear the display buffer, which is identical to the one shown in FIG. 9.

Then, the display contents are output (step S86). More specifically, the contents of the display buffer cleared in step S85 are supplied via the buffer 31 to display apparatus 24 from the output ports PORT0 to PORT4 of the display controller 22. Immediately after key depression, all the light-emitting elements are in a deactivated (OFF) state.

A counter setting process is then executed (step S87) in which an attack time value included in the envelope information of the associated tone part is set in the associated counter 21. Then, that counter 21 is instructed to perform countdown (step S88), and the flow returns to the main routine from this key depression process.

Accordingly, the counters 21 perform a countdown operation every time a count pulse is generated from the pulse generator 23 or upon each occurrence of an interruption.

Figure 18:
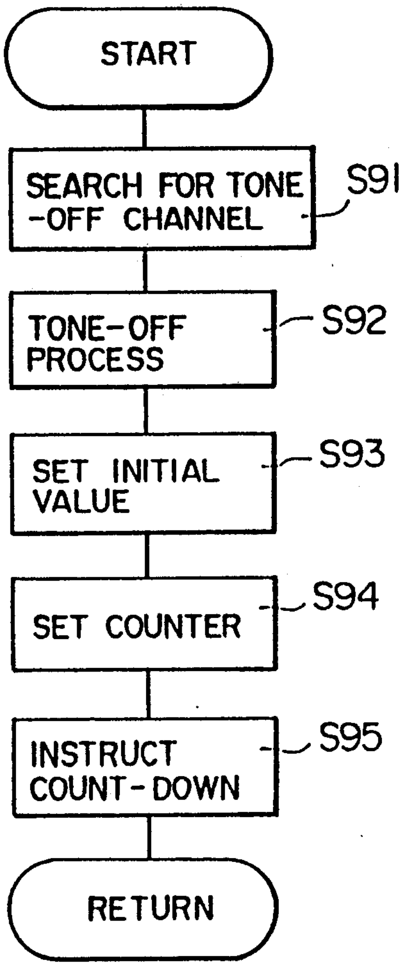
FIG. 18 is a flowchart illustrating a key release process in FIG. 16.

FIG. 18 gives a detailed flowchart illustrating a key release process that is to be executed in steps S8 and S23 in FIG. 16.

This key release process is almost identical to the one according to the first embodiment shown in FIG. 6, and is different therefrom only in the contents of an initial-value setting process to be carried out in step S93.

In other words, this initial-value setting process is to set a count value corresponding to the release time value in the envelope information in the register section 20; refer to the foregoing description of FIG. 6 for the contents of the processes in the other individual steps.

Figure 19:
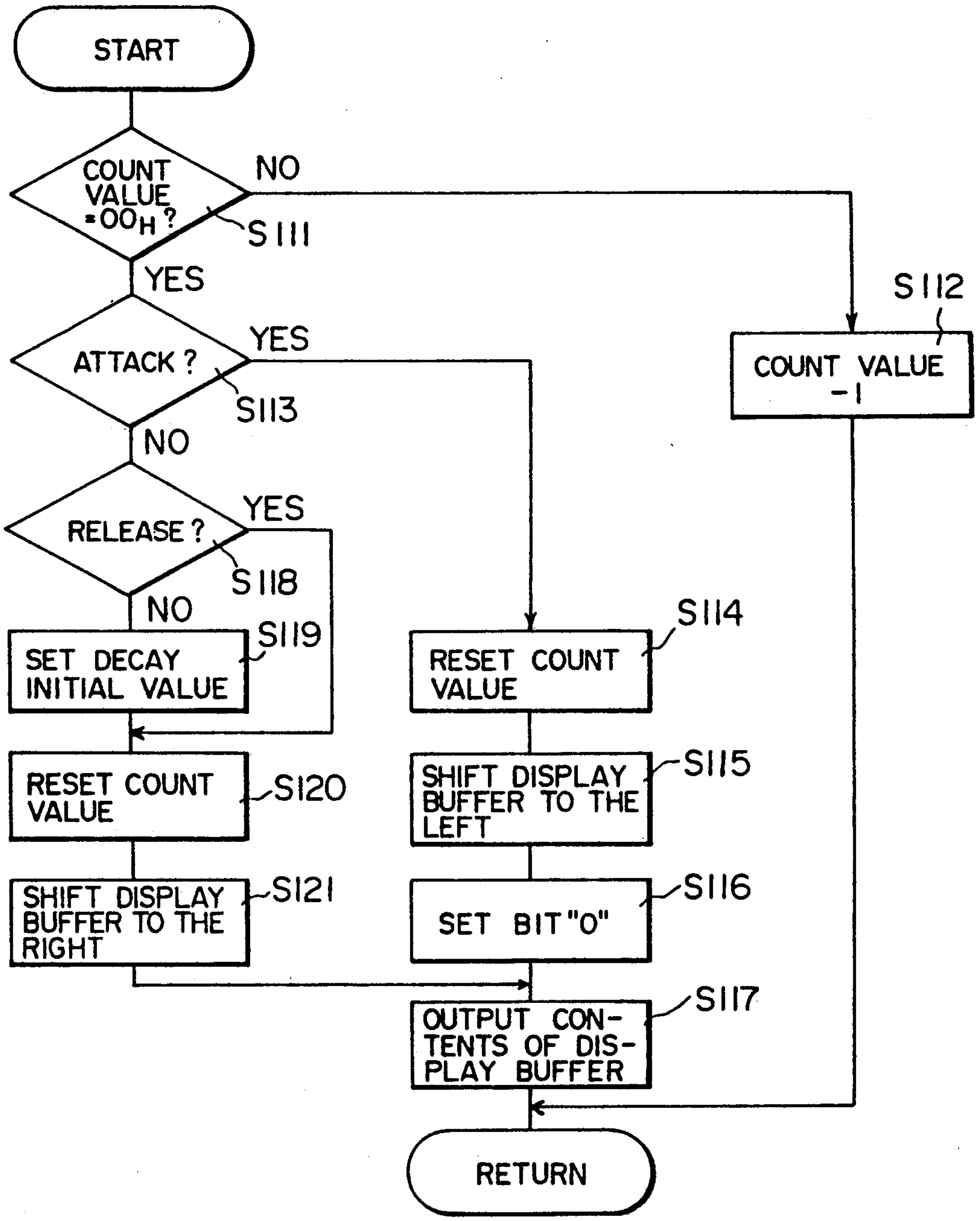
FIG. 19 is a flowchart illustrating a count value process in FIG. 7 according to the second embodiment of the first invention.

An interrupt process will now be described. In the interruption according to this embodiment, the interrupt routine shown in FIG. 7 is used, but with different contents of the routine for the count value process called in the interrupt process routine. FIG. 19 illustrates a detailed flowchart for the count value process.

This interrupt routine is invoked by an interrupt signal, and it is determined whether or not counting for a melody 1 is instructed, i.e., if the counter $21_1$ is in operation (step S51), as shown in FIG. 7, referring to tone part information which is stored in a predetermined buffer. When the counter $21_1$ is judged to be in operation, a subroutine for a count value process shown in FIG. 19 is called (step S52).

In this subroutine, it is determined first if the current count value of the counter $21_1$ is "$00_H$," as shown in FIG. 19 (step S111). If that count value is not "$00_H$," the contents of the counter $21_1$ are decremented (step S112), and the flow returns from the subroutine to the main routine.

If it is judged in step S111 that the count value is "$00_H$," it is then checked whether the phase of the envelope that is presently being generated is the attack phase (step S113). If it is the attack phase, the count value is set again (step S114). That is, what is held in the count initial value register $20_1$ is set in the corresponding counter $21_1$.

Then, the contents of the display buffer are shifted by one bit to the left (step S115), and "1" is set in bit 0, the least significant bit, which has become empty by the shifting (step S116). Subsequently, the contents of the display buffer are output (step S117), thereby lighting one of the light-emitting elements in the display apparatus 24.

If the phase of the envelope is not judged to be the attack phase in step S113, it is checked whether it is the release phase (step S118). If it is not the release phase, it is recognized as the decay phase so that a decay initial value or what corresponds to the decay time is set in the register $20_1$ (step S119). If it is judged as the release phase in step S118, step S119 will be skipped.

Then, the count value is set again (step S120). That is, what is held in the count initial value register $20_1$ is set in the corresponding counter $21_1$.

The contents of the display buffer are then shifted to the right by one bit (step S121), and the flow branches to step S117 where the contents of the display buffer are output. This deactivates one of the light-emitting elements in the display apparatus 24.

Returning to FIG. 7, when it is judged in step S51 that counting for the melody 1 has not been instructed, it is then determined whether counting for a melody 2 is instructed, i.e., if the counter $21_2$ is in operation (step S53). When the counter $21_2$ is judged to be functioning, the subroutine for the count value process in FIG. 19 is called (step S54). The operation of this subroutine will not be discussed below because it is the same as the one described above, except that the counter $21_2$ corresponding to the melody 2 is involved.

Thereafter, the counting operation is performed on a chord, bass and rhythm in the same manner as done on the melody, and the contents of the counters $21_3$ to $21_5$ are updated.

According to the first invention, as described above, activation and deactivation of the display apparatus 24 are controlled using envelope information, and the display apparatus can show a rise in level of a slow-rising musical tone, such as a string sound, as well as display the sustain sound system/attenuating sound system.

As explained in detail above, the first invention can provide a simple and inexpensive display apparatus for an electronic musical instrument which can display the output signal levels of musical tones of each tone part irrespective of the output parts.

Embodiment of Second Invention

Figure 20:
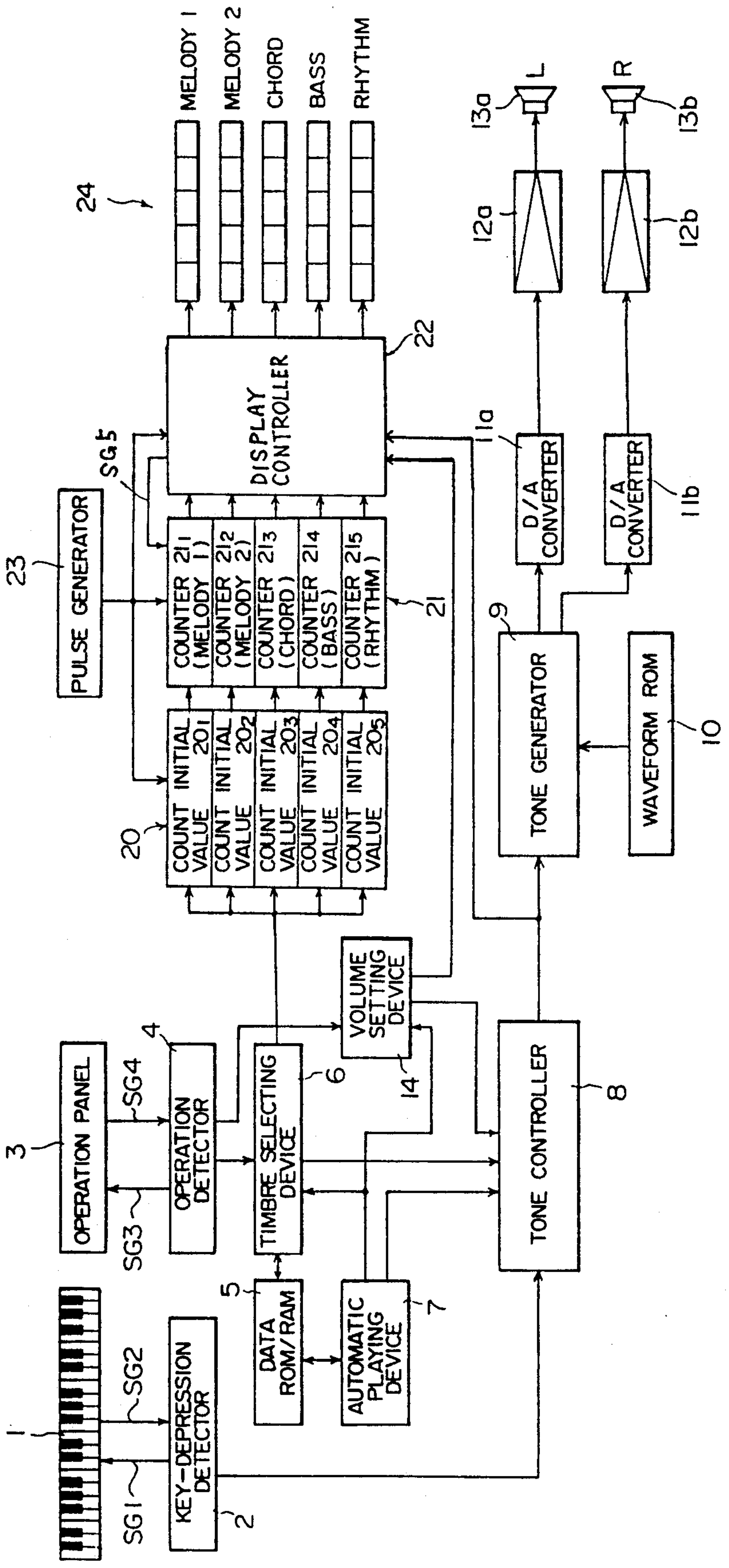
FIG. 20 is a block diagram illustrating the general structure of an electronic musical instrument to which a display apparatus according to the second invention is applied.

FIG. 20 is a block diagram illustrating the general structure of an electronic musical instrument to which a display apparatus according to the second invention is applied. The structural feature of this invention is a volume setting device 14 added to the structure of the display apparatus embodying the first invention.

The same reference numerals as used for the components of the display apparatus embodying the first invention as shown in FIG. 1 will be used hereunder to specify the identical or corresponding portions in order to avoid a redundant description. The following will mainly discuss the volume setting device 14.

An operation panel 3 is provided with a volume change switch, which directly concerns the feature of the second invention, in addition to the above-described various switches, such as the timbre select switch, mode switch and rhythm select switch.

As described above, an operation detector 4 sends a scan signal SG3 to the operation panel 3, and receives data SG4 representing the set status of any switch on the operation panel 3. The received data SG4 is then supplied to the volume setting device 14 as well as a timbre selecting device 6.

The timbre selecting device 6 reads out timbre information from the data ROM/RAM 5 in accordance with timbre change information sent via the operation detector 4 from the operation panel 3 or the timbre change information output from an automatic playing device 7 to be described later, and supplies it to a tone controller 8. The timbre selecting device 6 also supplies an attack time value and a release time value included in the envelope information read out from the data ROM/RAM 5 to a register section 20.

The automatic playing device 7 reads out automatic play data from the data ROM/RAM 5 and sends it to the ton controller 8. This device 7 also sends timbre information to the timbre selecting device 6 and volume information to the volume setting device 14. This creates the same conditions as provided when a keyboard 1 or the operation panel 3 is operated, ensuring automatic music performance.

The volume setting device 14 receives volume information sent via the operation detector 4 from a tone volume (not shown) on the operation panel 3 or volume information from the automatic playing device 7, and sends the volume information to the tone controller 8 for determining the tone level and to a display controller 22 for displaying the volume level.

The tone controller 8 assigns a tone-ON channel in accordance with key information sent via the key-depression detector 2 from the keyboard 1 or key information from the automatic playing device 7, and sends out data according to the timbre selected by the timbre selecting device 6 and volume information set by the volume setting device 14 to a tone generator 9. Data (velocity, pitch, volume, etc.) about the tone level from this tone controller 8 is also supplied to the display controller 22 which will be described later.

The tone generator (tone source) 9, wave ROM 10, D/A converters 11*a* and 11*b*, amplifiers 12*a* and 12*b* and sound systems 13*a* and 13*b* are the same as those in FIG. 1.

The register section 20 stores an attack time value and a release time value as display time information included in the envelope information stored in the data ROM/RAM 5. This register section 20 comprises five count initial value registers $20_1$ to $20_5$ in association with individual tone parts, namely, melody 1, melody 2, chord, bass and rhythm, as per the first invention. The contents of this register section 20 are sent to a counter section 21.

The counter section 21 counts down from the set data. This counter section 21 likewise comprises five counters $21_1$ to $21_5$ for the respective tone parts (melody 1, melody 2, chord, bass and rhythm). The counters $21_1$ to $21_5$ are initialized with the contents of the respective registers $20_1$ to $20_5$ in accordance with a control signal SG5 from the display controller 22. The counter section 21 performs a counting operation in synchronism with a pulse signal from a pulse generator 23 to be described later. The contents of the counters $21_1$ to $21_5$ are also supplied to the display controller 22.

The display controller 22 controls activation and deactivation of a display apparatus 24. In other words, the display controller 22 performs such control as to activate or deactivate the display apparatus 24 in accordance with the tone level from the tone controller 8 or volume information from the volume setting device 14.

The pulse generator 23 and the display apparatus 24 are identical to those of the first invention. Since the detailed structure between the display controller 22 and the display apparatus 24 is the same as is shown in FIG. 2, its description will not be repeated below.

While a key-depression detector 2, the operation detector 4, the timbre selecting device 6, the automatic playing device 7, the tone controller 8, the volume setting device 14 and the display controller 22 in this embodiment are realized by hardware, they may be realized instead by the functions of a CPU such as a microprocessor.

Further, while the register section 20 for count initial values and the counter section 21 may both be realized by hardware, they may be realized by registers and counters provided in a memory.

The operation of the display apparatus having the above structure will be described below.

The following description will be given mainly on the case where the display apparatus functions in accordance with the operation of the keyboard 1 and operation panel 3, with a brief explanation about the operation involving the automatic playing device 7. The operation involving the automatic playing device 7 is the same as has been explained earlier, except that information about tone generation is automatically read out from the data ROM/RAM 5, instead of the data from the keyboard 1 and operation panel 3.

The storage format of the data ROM/RAM 5 according to one embodiment of the second invention is the same as the one used in the second embodiment (FIG. 15) of the first invention.

Figure 21:
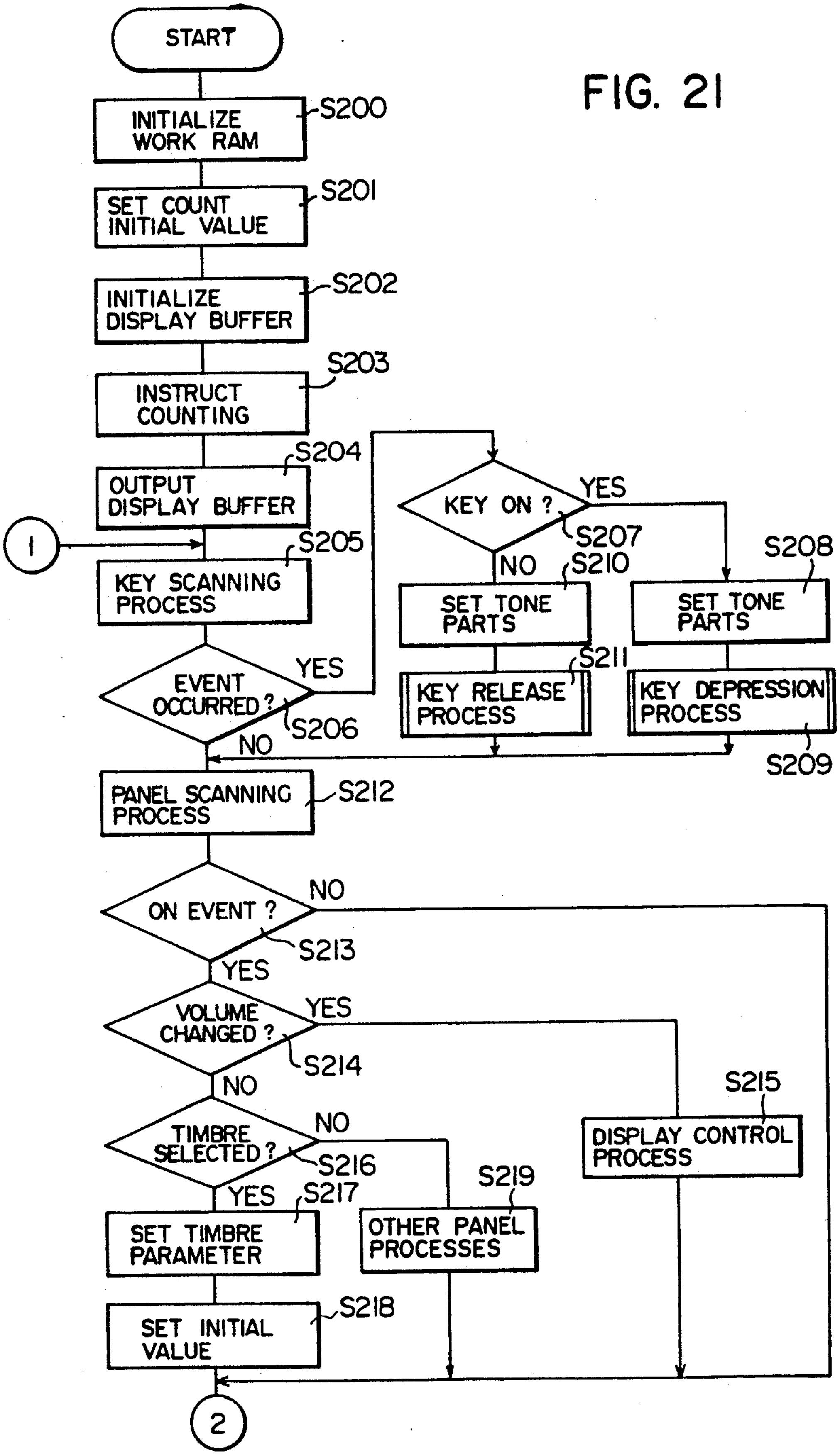
FIGS. 21 and 22 present a main flowchart illustrating the operation of the embodiment of the second invention.
Figure 22:
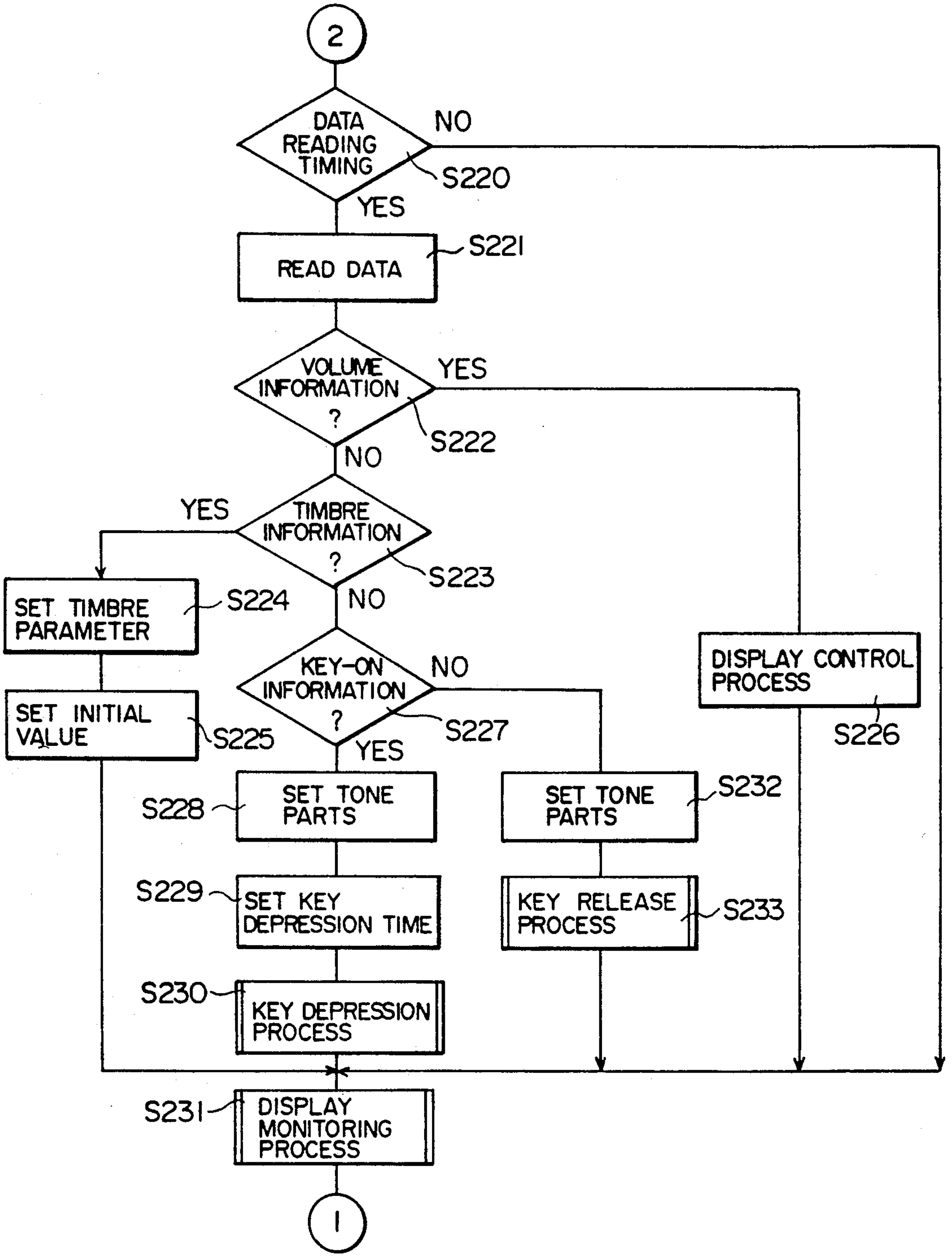

FIGS. 21 and 22 illustrate a main routine for the operation of an electronic musical instrument to which the present display apparatus is applied.

First, the tone controller 8 performs initialization of a work RAM (not shown) in step S200. In the initialization a predetermined initial value is set in the work RAM, for example.

Then, a count initial value is set (step S201). That is, a predetermined value, e.g., "$20_H$", is set in the register section 20 and the counter section 21. Accordingly, every time a pulse from the pulse generator 23 is counted "$20_H$" times, the light-emitting elements of the associated indicator are deactivated one by one unless the contents of the register section 20 are altered.

Then the display buffer is initialized (step S202); that is, the maximum value "$1F_H$" is set in the display buffer.

The counters 21 for all the parts are instructed to start a counting operation (step S203), and the contents of the display buffer are output to the display apparatus 24 (step S204). This turns on all of the indicators $24_1$–$24_5$ of the display apparatus 24.

When the initialization sequence is completed, a key process (steps S205 to S211) is performed. As this key process is identical to the one (steps S2 to S8) in FIG. 4, its description will not be given.

When the key process is terminated, a panel process (steps S212 to S219) is executed. In this panel process, first, a panel scanning process is carried out (step S212). In other words, the tone controller 8 fetches data representing the operational status of the operation panel 3, detected by the operation detector 4. It is then checked whether or not the fetched data shows the occurrence of any event, i.e., whether any switch on the operation panel 3 has been rendered ON (step S213). If it is determined that an ON event has occurred, it is then checked if the event is volume alteration or if the tone volume on the operation panel 3 has been operated (step S214). When it is determined that the tone volume has been operated, a display control process (step S215) is executed before the flow branches to step S220.

The display control process is to set a tone part request flag to request for display of a tone part volume value, and to set the altered volume information in a tone part display buffer. The "volume information" is a value corresponding to the tone volume on the operation panel 3 and is expressed in 16 levels from $00_H$ to $0F_H$. This volume information is set for each tone part.

The tone part display buffer has a single-byte structure for each tone part, the lower five bits corresponding to light-emitting elements L#0 to L#4 of the associated indicator.

In the process of setting the tone part display buffer, the tone part display buffer will be set in accordance with the volume information as follows:

(1) volume information $00_H$ . . . clear all bits to 0
(2) volume information $01_H$–$03_H$ . . . set bit 0
(3) volume information $04_H$–$06_H$ . . . set bit 1
(4) volume information $07_H$–$09_H$ . . . set bit 2
(5) volume information $0A_H$–$0C_H$ . . . set bit 3
(6) volume information $0D_H$–$0F_H$ . . . set bit 4

When it is judged in step S214 that volume alteration is not specified, it is then checked if the ON event is the timbre selection or whether or not the timbre select switch (not shown) has been operated (step S216). When the ON event is judged to be the timbre selection, timbre parameters are set in the timbre selecting device 6 (step S217), and initialization (step S218) is performed before advancing to step S220.

When the ON event is not judged as the timbre selection in step S216, a panel operation corresponding to the operated switch is performed (step S219), and the flow advances to step S220.

When it is determined in step S213 that no ON event has occurred, the flow also advances to step S220.

In a sequence of processes starting with step S220, automatic playing will be executed. As the first step in the automatic playing process, it is checked whether or not the data reading timing for the automatic playing device 7 has arrived (step S220). If the data reading timing has not arrived, the flow branches to step S231 to execute a display monitoring process, which will be described later.

If it is determined in step S220 that the data reading timing has arrived, a data read process is performed (step S221). Subsequently, it is checked if the read-out data is volume information (step S222). If the volume information is judged to have been read out, the same display control process as done in step S215 is executed (step S226), and the flow then branches to step S231.

If it is determined in step S221 that the read-out data is not volume information, it is checked if the read-out data is timbre information (step S223). If the timbre information is judged to have been read out, the same timbre parameter setting (step S224) and the same initialization (step S225) as described above are executed. The flow then branches to step S231 to perform the display monitoring process.

If it is not judged in step S223 that the read-out data is timbre information, it is then checked whether this data is key-ON information (step S227). When it is the key-ON information, tone parts are set (step S228), a key depression time is set (step S229), and a key depression process is performed (step S230). Then, the flow advances to step S231 to perform the display monitoring process.

When it is determined in step S227 that the read-out data is not key-ON information, it is considered as key-OFF information, and a tone-part setting process (step S232), and a key release process is performed (step S233). Then, the flow branches to step S231 to execute the display monitoring process.

When the display monitoring process is terminated, the flow returns to step S205 and the same sequence of processes described above will be repeated.

Figure 23:
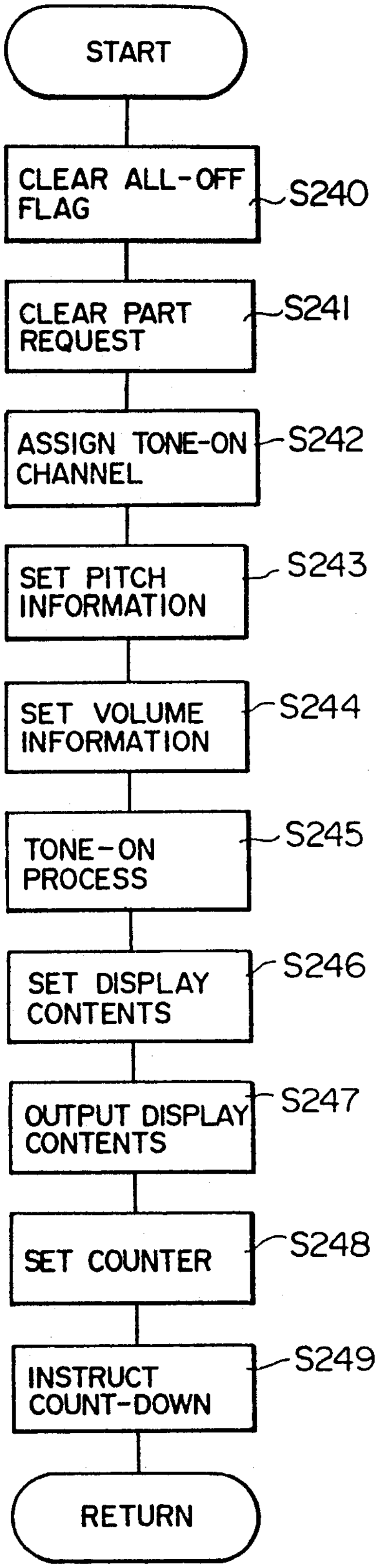
FIG. 23 is a flowchart illustrating a key depression process in FIGS. 21 and 22.

FIG. 23 is a detailed flowchart illustrating a key depression process to be performed in step S209 in FIG. 21 and step S230 in FIG. 22.

In the key depression process, first, an all-OFF flag is cleared (step S240), and the tone part request flag is cleared (step S241).

Then, a tone-ON channel is assigned (step S242), and pitch information is set in a predetermined buffer (step S243). These processes are the same as done in steps S31 and S32 in FIG. 5.

Volume information is then set in a predetermined buffer (step S244). The volume information is the value which is determined by adding touch (velocity) information, accent information for each timbre, etc. to volume information set by the tone volume on the operation panel 3. The volume information is expressed by 128 levels from $00_H$ to $7F_H$. This volume information is set for each tone part.

When setting those parameters is completed, a tone-ON process (step S245), setting of display contents (step S246) and outputting the display contents (step S247) are carried out. Since those individual processes are the same as those in steps S34 to S36, which have already been described referring to FIG. 5, their description will not be given below.

Figure 27A:
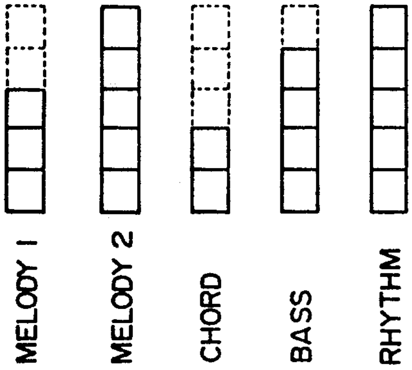
FIGS. 27A, 27B, 28A, 28B, 29A, 29B, 30 and 31 are diagrams exemplifying what is displayed by the display apparatus according to the embodiment of the second invention.

Through the above-described sequence of processes, the light-emitting elements of the indicator selected by the selector 30 are lit in accordance with the volumes of the individual tone parts, as shown in, for example, FIG. 27A, a user can see the volume balance of the tone levels of the individual tone parts.

Then, a counter setting process is performed (step S248). That is, the attack time value in the envelope information for the associated tone part is set in the associated count initial value register 20, and the contents of this register 20 are set in the corresponding counter 21.

Then, countdown of the values in that counter 21 is instructed (step S249). The countdown operation is executed upon each generation of a count pulse from the pulse generator 23, i.e., upon each interruption.

Figure 24:
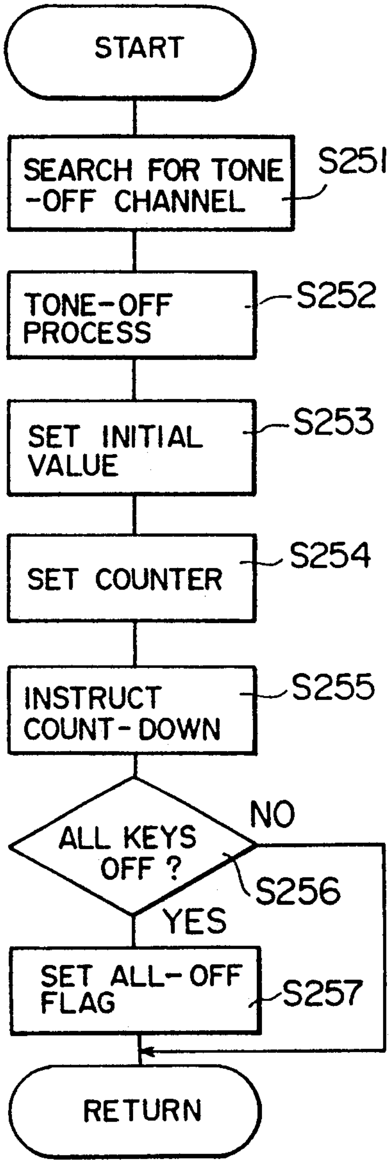
FIG. 24 is a flowchart illustrating a key release process in FIGS. 21 and 22.

FIG. 24 is a detailed flowchart for the key release process which is to be performed in step S211 in FIG. 21 and step S233 in FIG. 22.

Searching for a tone-OFF channel is performed first in the key release process (step S251). More specifically, the tone-ON channels in the tone generator 9 are searched for a channel corresponding to the released key.

A tone-OFF process is performed on a searched channel (step S252). This tone-OFF process is to instruct the tone generator 9 to stop tone generation.

This disables releasing musical tones from the sound systems 13*a* and 13*b*.

When the tone-OFF process is completed, initial-value setting is performed (step S253). In this process, the release time value in the envelope information is set as a count initial value in the register section 20. A counter setting process is then performed (step S254). The contents of the count initial value register 20 for the associated tone part are set to the corresponding counter 21. Then, countdown of the value in that counter 21 is instructed (step S255). As a result, a countdown operation is performed upon each generation of a count pulse from the pulse generator 23, i.e., upon each interruption.

It is then determined whether or not all keys are OFF (step S256). If the keys are all OFF, the all-OFF flag is set (step S257), and the flow returns from the subroutine to the main routine. If all the keys are not OFF, the flow returns from the subroutine to the main routine, with the all-OFF flag remaining unchanged.

Figure 25:
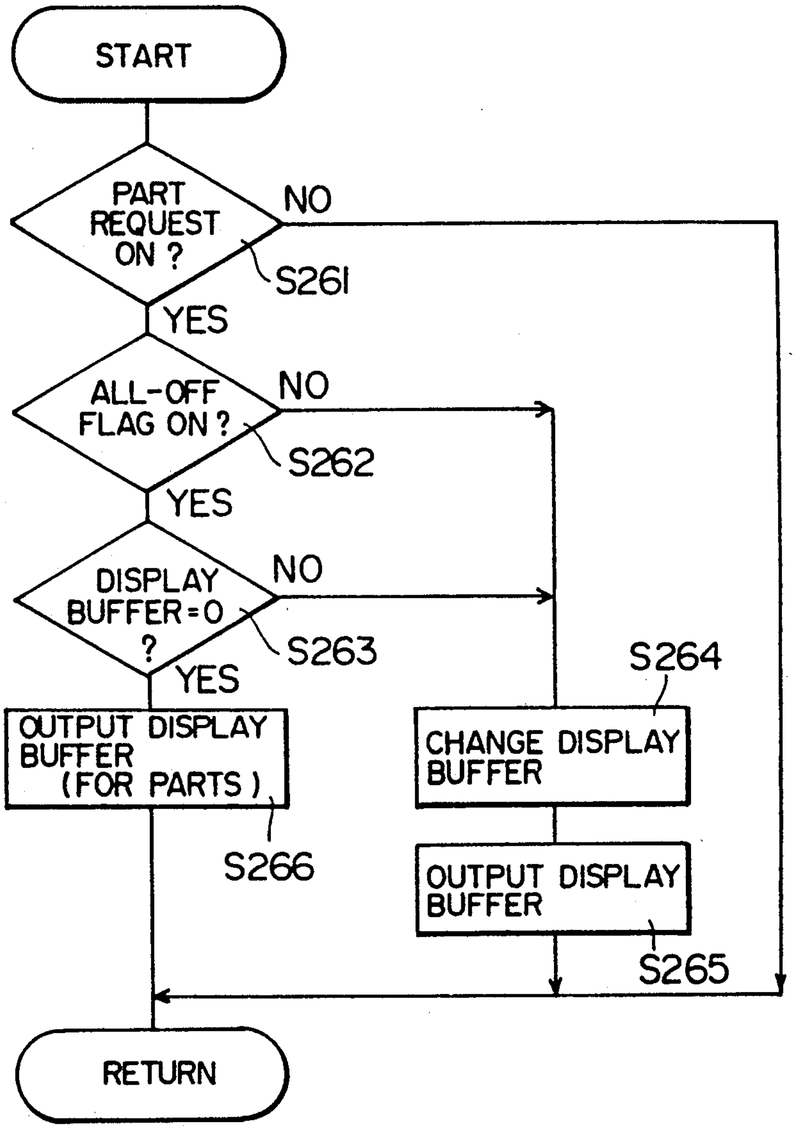
FIG. 25 is a flowchart illustrating a display monitoring process in FIG. 21.

FIG. 25 is a detailed flowchart showing the display monitoring process to be performed in step S231 in FIG. 22. In the display monitoring process, a change in the tone volume on the operation panel 3 is detected, and the display mode is changed according to the volume change from the normal display of the tone-ON level.

In the display monitoring process, it is determined if the part request flag is ON (step S261). If the flag is not ON, or if the volume has not yet been changed, no display change is needed, so the flow returns from the subroutine to the main routine without performing further processes.

Figure 27B:
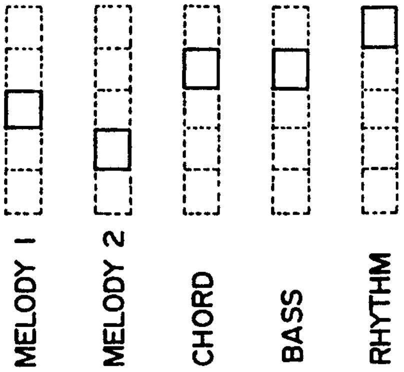

If the tone part request flag is judged ON, it is determined whether or not the all-OFF flag is ON (step S262). When the all-OFF flag is judged ON, it is then checked if the contents of the display buffer are "0" (step S263). When the contents of the display buffer are judged to be "0," the contents of the part display buffer are output (step S266), and the flow returns from the subroutine to the main routine. In this manner, the contents of the part display buffer are displayed on the display apparatus 24 in a display mode shown in FIG. 27B, for example.

When the all-OFF flag is not judged to be ON in step S262, or the contents of the display buffer are not judged as "0" in step S263, a display-buffer changing process is performed (step S264). In this process, a change in the tone volume on the operation panel 3 is reflected on the alteration of the contents of the display buffer.

If the tone volume is operated in the increasing direction (+), for example, the contents of the display buffer are shifted to the left so that "1" is set in the empty least significant bit (bit 0). When the tone volume is operated in the decreasing direction (−), the contents of the display buffer are shifted to the right.

Figure 28A:
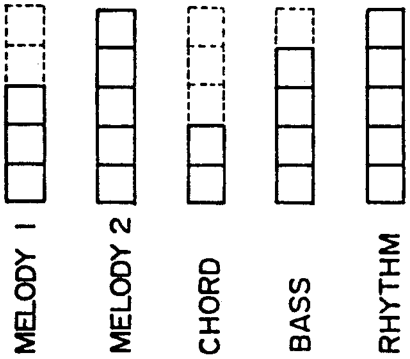
Figure 28B:
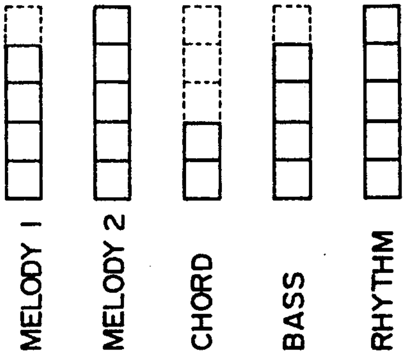
Figure 29A:
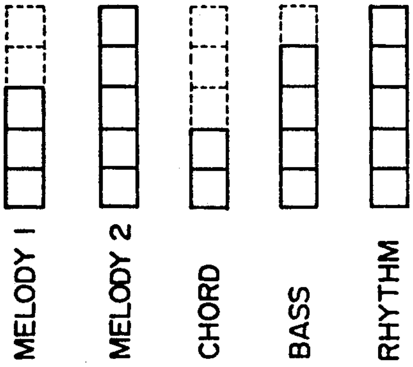
Figure 29B:
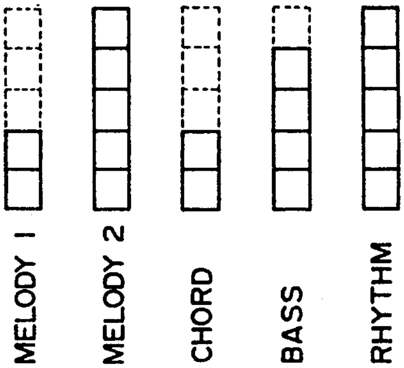

The altered contents of the display buffer are output to the display apparatus 24 (step S265). Accordingly, the volume change is indicated as an increase or decrease. For example, to increase the volume level of the melody 1, one more light-emitting element is lit in addition to those light-emitting elements in the ON state in the tone-ON level, as shown in FIGS. 28A and 28B. To drop the volume level of the melody 1, on the other hand, the display mode is changed so that the light-emitting elements in the ON state are fewer by one than those in the tone-ON level, as shown in FIGS. 29A and 29B.

The volume level can also be displayed in a different display mode in association with the amount of the volume change. In this case, the processes in steps S264 and S265 should be performed as follows.

The contents of the display buffer are moved to a mode buffer which is newly provided and has the same format as the display buffer. The contents of the mode buffer are then shifted to the left or the right in accordance with the rise (+)/drop (−) of the volume. Then, the exclusive logical sum of the contents of both mode and display buffers is acquired and stored in the mode buffer. Only information of the amount of change in the volume is therefore stored in the mode buffer. The contents of the display buffer are shifted to the left or the right in accordance with the rise (+)/drop (−) of the volume.

The contents of the mode buffer are sent to a blue LED matrix, while the contents of the display buffer are supplied to a red LED matrix, for example.

In this manner, therefore, the volume level can be indicated changing the display mode (color) in association with the amount of the volume change. The user can therefore distinctively see the tone-ON level, the volume level and the amount of the volume change at the same time.

Figure 26:
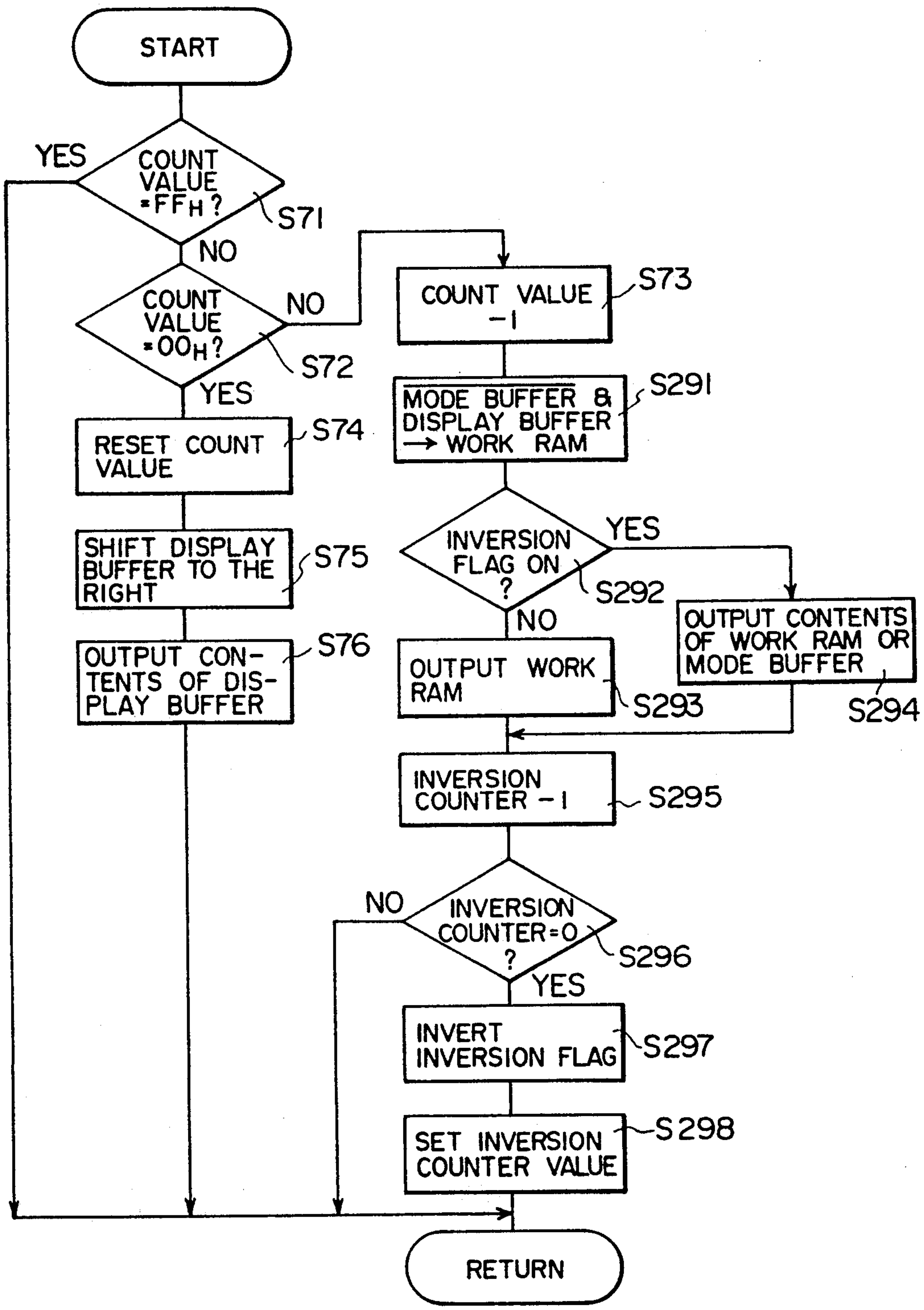
FIG. 26 is a flowchart illustrating a modification of a count value process in FIG. 7 according to the embodiment of the second invention.

FIG. 26 shows a detailed flowchart of the interrupt process. Since the interrupt process in one embodiment of the second invention is the same as that in the first embodiment (already explained referring to FIGS. 7 and 8) of the first invention, the explanation will be omitted.

A description will now be given of another embodiment where a change in volume is displayed by blinking light-emitting elements as described in the explanation of the display monitoring process.

Such a display is possible if the count value process in the interrupt routine is to be performed as shown in the flowchart in FIG. 26. The same reference numerals as used to specify the processes in FIG. 8 will be given to identical or corresponding to those in FIG. 26 to avoid their otherwise redundant explanation.

An "inversion flag," which holds data representing the ON/OFF state of the light-emitting elements, and an "inversion counter," which counts the inversion interval, are newly used in this process.

In FIG. 26, when the count value is not judged as "$00_H$," and is decremented (step S73), the logical product of the inverted contents of the mode buffer and the contents of the display buffer is acquired and stored in the work RAM (step S291). Data with the amount of change in the contents of the display buffer set to "0" is held in the work RAM. It is then checked if the inversion flag is ON (step S292). If the inversion flag is not ON, the contents of the work RAM are output without any change (step S293). The light-emitting elements associated with the change are turned off in the display apparatus. When the inversion flag is ON, the logical sum of the contents of both the work RAM and mode buffer is obtained, and is output (step S294). The light-emitting elements associated with the change are therefore lit.

Next, the inversion counter is decremented (step S295), and it is checked if this counter is "0" (step S296). If not, the flow returns to the main routine.

If the inversion counter has a value of "0," the inversion flag is inverted (step S297) to set the initial value to the inverted counter (step S298).

Through the above-described processes, the light-emitting elements associated with the amount of the volume change are blinked at predetermined intervals.

Figure 30:
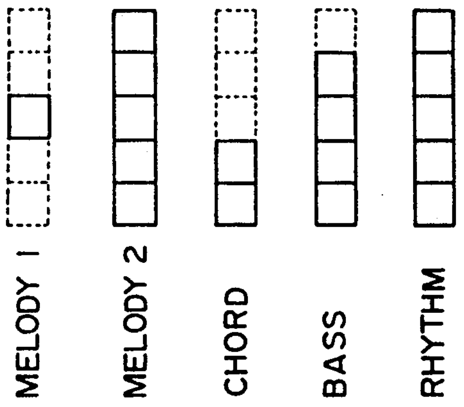

Further, as shown in FIG. 30, the display apparatus may be designed to indicate the volume level for a given time when the tone volume for a predetermined tone part (melody 1 in FIG. 30) is changed.

Figure 31:
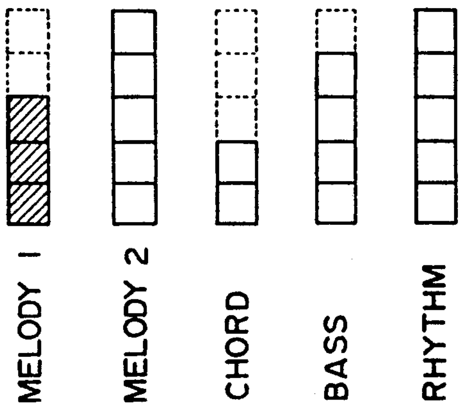

As shown in FIG. 31, the display apparatus may also be designed to indicate the altered volume level by means of blinking lights, or with a different color from the one used to indicate the tone-ON level. The objects of the present invention can be achieved in either case.

When all keys are detected OFF, instead of stopping the display in the display apparatus 24, another information, such as volume information or a battery voltage level, may be displayed on the display apparatus. With this structure, the display apparatus will be utilized more effectively.

Further, the display apparatus may be designed to display predetermined data for a moment even when no event has occurred at the time of the power on, according to the embodiments described above. Proper data to be indicated is all-ON data, random data or a battery voltage level.

With such a structure, a player can see when the power is turned on. Also when the all-ON data is displayed, the player can check if the light-emitting elements of the display apparatus 24 are out of order.

As described above, the present invention can provide a display apparatus for an electronic musical instrument, which informs the player of the volume level for each tone part upon the operation of the volume switch, or upon reception of the volume information from the automatic playing device.

What is claimed is:

1. A display apparatus for an electronic musical instrument, comprising:

display means including a predetermined plurality of indicators, each indicator of said predetermined plurality of indicators representing a predetermined tone part such as melody, bass, and the like, and each indicator of said predetermined plurality of indicators having a plurality of display elements;

storage means for storing lighting time information for each display element of said plurality of display elements, in association with multiple timbres;

register means for reading out said lighting time information from said storage means and registering said lighting time information when a predetermined timbre is selected;

counter means for performing a counting operation in a predetermined time interval with said lighting time information registered in said register means as an initial value; and control means for, when generation of a musical tone is instructed, lighting a predetermined quantity of display elements of said plurality of display elements which are associated with said tone parts of said predetermined tone parts, said predetermined quantity of display elements corresponding to volume information of said musical tone, and for turning off a predetermined quantity of display elements of said plurality of display elements when a count value of said counter means reaches a predetermined value and thereafter re-setting said lighting time information held in said register means in said counter means to re-start a counting operation.

2. A display apparatus according to claim 1, wherein said lighting time information is stored in said storage means, as part of multiple pieces of timbre information associated with multiple timbres.

3. A display apparatus according to claim 1, wherein for each envelope information, said lighting time information is stored in said storage means, as part of envelope information selected by a predetermined information included in multiple pieces of timbre information associated with multiple timbres.

4. A display apparatus according to claim 1, wherein said control means, when generation of said musical tone of an attenuating sound system is instructed, lights predetermined display elements which are associated with said tone parts of said musical tone and whose quantity corresponds to said volume information of said musical tone, and turns off one of said display elements when said count value of said counter means reaches said predetermined value and re-sets said lighting time information held in said register means in said counter to re-start said counting operation.

5. A display apparatus according to claim 1, wherein said control means, when generation of said musical tone of a sustain sound system is instructed, lights predetermined display elements which are associated with said tone parts of said musical tone and whose quantity corresponds to said volume information of said musical tone, and, when said tone-OFF of said musical tone is instructed, turns off one of said display elements when said count value of said counter means reaches said predetermined value and re-sets said lighting time information held in said register means in said counter to re-start said counting operation.

6. A display apparatus according to claim 1, wherein said counter means performs said counting operation in synchronism with an interrupt signal generated in a predetermined time interval.

7. A display apparatus according to claim 1, wherein said multiple display elements of said display means are LEDs.

8. A display apparatus according to claim 1, wherein said lighting time information held in said register means is envelope information, and said control means, when generation of a musical tone is instructed, lights predetermined display elements which are associated with said tone parts of said musical tone and whose quantity corresponds to said envelope information, and turns off or on one of said display elements in accordance with said envelope information when said count value of said counter means reaches a predetermined value, and re-sets said envelope information held in said register means in said counter means to re-start a counting operation.

9. A display apparatus according to claim 8, wherein said envelope information includes attach, decay and release information.

10. A display apparatus according to claim 8, wherein said counter means performs said counting operation in synchronism with an interrupt signal generated in a predetermined time interval.

11. A display apparatus according to claim 8, wherein each display element of said plurality of display elements is an LED.

12. A display apparatus for an electronic musical instrument, comprising:

a display means;

said display means including a plurality of indicators;

each indicator of said plurality of indicators associated with an individual tone part of a musical tone;

each indicator of said plurality of indicators including a plurality of display elements;

first control means for controlling activation/deactivation of individual display elements of said plurality of display elements to provide a display in a first display mode according to a tone level; and second control means for controlling activation/-deactivation of individual display elements of said plurality of display elements to permit a display in a second display mode according to a volume level.

13. A display apparatus according to claim 12, wherein in said first display mode, a predetermined number of display elements which correspond to said tone-ON level are continuously lit.

14. A display apparatus according to claim 12, wherein said second control means is activated according to a change in volume information.

15. A display apparatus according to claim 12, wherein in said second display mode, a predetermined number of display elements which correspond to said volume level are continuously lit.

16. A display apparatus according to claim 12, wherein said second display mode is a mode in which that number of said display elements which corresponds to an amount of change in volume are continuously lit.

* * * * *

UNITED STATES PATENT AND TRADEMARK OFFICE

CERTIFICATE OF CORRECTION

PATENT NO. : 5,247,864
DATED : September 28, 1993
INVENTOR(S) : Shinya Konishi

It is certified that error appears in the above-indentified patent and that said Letters Patent is hereby corrected as shown below:

Title Page, under Assignee please correct patent to state:

Assignee: Kabushiki Kaisha Kawai Gakki Seisakusho, Hamamatsu, Japan

Signed and Sealed this

Thirty-first Day of May, 1994

Attest:

Bruce Lehman

BRUCE LEHMAN

*Attesting Officer*

*Commissioner of Patents and Trademarks*